(12) United States Patent
Miyashita et al.

(10) Patent No.: US 8,970,784 B2
(45) Date of Patent: Mar. 3, 2015

(54) DRIVING APPARATUS, DRIVING METHOD, AND PROGRAM

(75) Inventors: Satoshi Miyashita, Kanagawa (JP); Daisuke Kuruma, Tokyo (JP); Daisuke Miyakoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 13/609,691

(22) Filed: Sep. 11, 2012

(65) Prior Publication Data

US 2013/0093953 A1   Apr. 18, 2013

(30) Foreign Application Priority Data

Oct. 13, 2011   (JP) ................. 2011-225478

(51) Int. Cl.
*H04N 5/06* (2006.01)
*H04N 5/343* (2011.01)
*H04N 5/353* (2011.01)

(52) U.S. Cl.
CPC ............ *H04N 5/343* (2013.01); *H04N 5/3532* (2013.01)
USPC ....................................................... 348/521

(58) Field of Classification Search
USPC ............. 348/521–523, 294, 302, 308
See application file for complete search history.

(56) References Cited

U.S. PATENT DOCUMENTS

| | | | | |
|---|---|---|---|---|
| 5,410,348 A | * | 4/1995 | Hamasaki | 348/296 |
| 6,239,779 B1 | * | 5/2001 | Furuya et al. | 345/87 |
| 6,995,801 B1 | * | 2/2006 | Nakakuki et al. | 348/364 |
| 2005/0057673 A1 | * | 3/2005 | Shimomura et al. | 348/294 |
| 2012/0242853 A1 | * | 9/2012 | Jasinski et al. | 348/222.1 |

FOREIGN PATENT DOCUMENTS

JP    2007-135073 A    5/2007

* cited by examiner

*Primary Examiner* — Aung S Moe
*Assistant Examiner* — Amy Hsu
(74) *Attorney, Agent, or Firm* — Oblon, McClelland, Maier & Neustadt, L.L.P.

(57) ABSTRACT

There is provided a driving apparatus which includes an acquisition section which acquires a parameter for driving an imaging element, which receives an optical image from a subject and outputs an imaging image as an electric signal, in an action mode which is desired by a user; a timing generation section which generates respective timings of the starting of each of a plurality of horizontal synchronization periods, where horizontal synchronization periods which are only different in terms of the number of clocks determined in advance are acquired in a mixed state, based on the parameter; and a driving control section which receives the optical image from the subject for each line which configures the imaging element by synchronizing the respective timings which are generated using the timing generation section.

10 Claims, 25 Drawing Sheets

FIG. 5

| ACTION MODE | PARAMETERS | |
|---|---|---|
| ACTION MODE 1 (FRAME RATE: 239.76 Hz NUMBER OF HORIZONTAL LINES: 1188) | DECODE VALUE decA OF HORIZONTAL SYNCHRONIZATION PERIOD A DECODE VALUE decB OF HORIZONTAL SYNCHRONIZATION PERIOD B THRESHOLD DECODE VALUE decV OF VERTICAL SYNCHRONIZATION PERIOD | .... |
| .... | | |

FIG. 18

| ACTION MODE | PARAMETERS |
|---|---|
| ACTION MODE 1<br>(FRAME RATE: 239.76 Hz<br>NUMBER OF<br>HORIZONTAL LINES: 1188) | SUM PHASE S<br>COMPARISON PHASE T<br>DECODE VALUE decA OF HORIZONTAL SYNCHRONIZATION PERIOD A<br>DECODE VALUE decB OF HORIZONTAL SYNCHRONIZATION PERIOD B<br>DECODE VALUE decV OF VERTICAL SYNCHRONIZATION PERIOD |
| .... | .... |

54 MHz CLOCK
1080 LINES
240 fps

206 CLOCKS / 207 CLOCKS IN RATIO OF 3:1

1192 H

DRIVING APPARATUS, DRIVING METHOD, AND PROGRAM

BACKGROUND

The present disclosure relates to a driving apparatus, a driving method, and a program, and in particular, relates to a driving apparatus, a driving method, and a program which are able to, for example, drive an imaging element using an action mode which is desired by a user.

In recent years, from imaging elements (image sensors) which receive an optical image from a subject and generate an imaging image as an electric signal by being synchronized with a horizontal synchronization signal, demand to read out an imaging image with an arbitrary frame rate, number of lines, number of pixels, and read out speed is increasing.

Therefore, an adjustment technique exists for adjusting the frame rate when reading out an imaging image by changing the horizontal synchronization signal which is used to control the imaging element (for example, Japanese Unexamined Patent Application Publication No. 2007-135073).

Initially, a case where the frame rate is adjusted to 59.94 Hz using the adjustment technique described above will be described.

For example, as shown in FIG. 1, it is necessary that a first to a fourth condition below are satisfied in a case where the imaging image which is configured by 1080 lines is read out with a frame rate of 59.94 Hz.

As a first condition, it is necessary that a vertical synchronization period which represents an interval with regard to falling edges which are generated in the vertical synchronization signal, that is, one frame period which represents an interval where an imaging image is read out being $900900 (=54 \times 10^6/59.94)$ clocks is satisfied. Here, the frequency of the clock is set at 54 MHz.

As a second condition, it is necessary that a horizontal synchronization period which represents an interval with regard to falling edges which are generated in a horizontal synchronization signal is set as a period of n clocks (for example 200 clocks) or more due to limiting A/D (analog/digital) conversion which is performed by the imaging element, a transfer rate when transferring the imaging image, or the like.

As a third condition, it is necessary that the vertical synchronization period and the horizontal synchronization period each represent a number of clocks which is an integer.

As a fourth condition, it is necessary that the number of horizontal synchronization periods in the vertical synchronization period is 1080, which is the number of lines which configure the imaging image, or more.

In this case, as shown in FIG. 1, if the horizontal synchronization signals where the horizontal synchronization period with 825 clocks are generated in only 1092 (=900900/825) periods in the vertical synchronization period, the first to the fourth conditions are satisfied and it is possible to adjust the frame rate to $59.94 (=54 \times 10^6/900900)$ Hz.

Here, in the adjustment technique described above, as shown in FIG. 1, the frame rate is adjusted by changing the number of horizontal synchronization periods and the number of the clocks in the horizontal synchronization period due to providing a blanking period. This is the same in FIGS. 2 and 3 which will be described later.

Next, a case where the frame rate is adjusted to 239.76 Hz using the adjustment technique described above will be described.

For example, in a case where the frame rate is adjusted to 239.76 Hz $(=4 \times 59.94)$ which is four times 59.94 Hz, as a first condition, it is necessary that a vertical synchronization period being $225225 (=54 \times 10^6/239.76)$ clocks is satisfied.

Accordingly, with the number of horizontal synchronization periods in the vertical synchronization period set as 1092, it is necessary that the horizontal synchronization period in one period is set as $206.25 (=54 \times 10^6/(239.76 \times 1092))$ clocks in a case where the fourth condition is satisfied.

In this case, since the horizontal synchronization period is set as 206.25 clocks, the horizontal synchronization period satisfies the second condition of being 200 clocks or more but the third condition that both the vertical synchronization period and the horizontal synchronization period are a number of clocks which is an integer is not satisfied.

Therefore, when a combination where the third condition described above is satisfied is searched for, there are two combinations which are respectively shown in FIGS. 2 and 3.

That is, as shown in FIG. 2, there is a combination where the number of horizontal synchronization periods in the vertical synchronization period is set as 1155 and one period of the horizontal synchronization period is 195 clocks.

However, the combination satisfies the fourth condition that the number of horizontal synchronization periods in the vertical synchronization period is 1080 or more but the second condition that the horizontal synchronization period is 200 clocks or more is not satisfied.

In addition, as shown in FIG. 3, there is a combination where the number of horizontal synchronization periods in the vertical synchronization period is set as 1001 and one period of the horizontal synchronization period is 225 clocks.

However, the combination satisfies the second condition that the horizontal synchronization period is 200 clocks or more but the fourth condition that the number of horizontal synchronization periods in the vertical synchronization period is 1080 or more is not satisfied.

SUMMARY

In the adjustment technique described above, it is difficult for the first to fourth conditions described above to be satisfied as shown in FIGS. 2 and 3 in cases where the frame rate which is to be adjusted is a high frame rate, the number of lines which are read out as the imaging image, and the like are large.

As a result, in the adjustment technique described above, there may be cases where the imaging image from the imaging element is not able to be read out with the frame rate (239.76 Hz in this case) and the number of lines (1080 in this case) which is desired by the user. In addition, in the adjustment technique described above, even if it is assumed that it is possible for the imaging image to be read out from the imaging element, this is accompanied with deterioration in image quality when reading out the imaging image.

It is desirable for it to be possible to drive an imaging element with an action mode which is desired by the user.

According to an embodiment of the present disclosure, there is provided a driving apparatus which includes an acquisition section which acquires a parameter for driving an imaging element, which receives an optical image from a subject and outputs an imaging image as an electric signal, in an action mode which is desired by a user, a timing generation section which generates respective timings of the starting of each of a plurality of horizontal synchronization periods, where horizontal synchronization periods which are only different in terms of the number of clocks determined in advance are acquired in a mixed state, based on the parameter, and a driving control section which receives the optical image from the subject for each line which configures the imaging element by synchronizing the respective timings which are generated using the timing generation section.

It is possible for the plurality of horizontal synchronization periods to be horizontal synchronization periods which are acquired in a mixed state to be only different in terms of the number of clocks determined in advance in a ratio so as to match a timing of completion of a vertical synchronization period which represents an interval where the imaging image is output from the imaging element and a timing of completion of the final horizontal synchronization period in the vertical synchronization period.

It is possible for the plurality of horizontal synchronization periods to be horizontal synchronization periods which are acquired in a mixed state in the ratio to be only different in terms of the number of clocks determined in advance for a plurality of unit periods which configure the vertical synchronization period.

It is possible for the number of horizontal synchronization periods in the vertical synchronization period to be the number of the respective lines, which configure the imaging image, or more.

It is possible for the horizontal synchronization period to be a number of clocks which is a number of clocks, which is determined in advance based on the imaging element, or more.

In the timing generation section, it is possible that, in a case where the vertical synchronization period matches the n (n is a positive integer) periods of the horizontal synchronization periods which have the same length, the respective timings of the starting of each of n horizontal synchronization periods which have the same length is generated, and in a case where the vertical synchronization period does not match the n periods of the horizontal synchronization periods which have the same length, the respective timings of the starting of each of the plurality of horizontal synchronization periods, which are acquired in a mixed state to be only different in terms of the number of clocks determined in advance, is generated.

In the driving control section, it is possible that the optical image from the subject is received for each line which configures the imaging element in a light receiving accumulation time from the timing to the completion of the predetermined plurality of horizontal synchronization periods and the number of clocks represents the number of clocks which are generated with a frequency based on a difference in different light receiving accumulation time out of the light receiving accumulation time for each line which configures the imaging element.

In the acquisition section, it is possible to acquire the parameter by calculation based on the action mode which is desired by the user.

In the acquisition section, it is possible to acquire the parameter which corresponds to the action mode which is desired by the user out of the plurality of parameters which are held in a holding section which holds the parameters in advance for each of the plurality of action modes.

In the timing generation section, a timing of starting of the vertical synchronization period is also generated based on the parameter.

In the driving control section, it is further possible to output the imaging image to the imaging element by synchronizing the timing of the starting of the vertical synchronization period.

According to another embodiment of the present disclosure, there is provided a driving method of a driving apparatus which drives an imaging element which includes acquiring a parameter for driving an imaging element, which receives an optical image from a subject and outputs an imaging image as an electric signal, in an action mode which is desired by a user, generating respective timings of the starting of each of a plurality of horizontal synchronization periods where horizontal synchronization periods, which are only different in terms of the number of clocks determined in advance, are acquired in a mixed state based on the parameter, and receiving the optical image from the subject for each line which configures the imaging element by synchronizing the respective timings which are generated in the generating of the respective timings, using the driving apparatus.

According to still another embodiment of the present disclosure, there is provided a program for making a computer function as an acquisition section which acquires a parameter for driving an imaging element, which receives an optical image from a subject and outputs an imaging image as an electric signal, in an action mode which is desired by a user, a timing generation section which generates respective timings of the starting of each of a plurality of horizontal synchronization periods, where horizontal synchronization periods which are only different in terms of the number of clocks determined in advance are acquired in a mixed state, based on the parameter, and a driving control section which receives the optical image from the subject for each line which configures the imaging element by synchronizing the respective timings which are generated using the timing generation section.

According to the embodiments of the present disclosure, a parameter is acquired for driving an imaging element, which receives an optical image from a subject and outputs an imaging image as an electric signal, in an action mode which is desired by a user, respective timings are generated for the starting of each of a plurality of horizontal synchronization periods, where horizontal synchronization periods which are only different in terms of the number of clocks determined in advance are acquired in a mixed state, based on the parameter, and the optical image from the subject is received for each line which configures the imaging element by synchronizing the respective timings which are generated using the timing generation section.

According to the embodiments of the present disclosure, it is possible to drive an imaging element in an action mode which is desired by a user.

BRIEF DESCRIPTION OF THE DRAWINGS

FIG. 5 is a diagram illustrating an example of a management table which is held in advance in a table storage section in FIG. 4;

FIG. 18 is a diagram illustrating an example of a management table which is held in advance in a table storage section in FIG. 17;

DETAILED DESCRIPTION OF EMBODIMENTS

Below, embodiments of the present disclosure (referred to below as embodiment) will be described. Here, the description will be performed in the following order.

1. First Embodiment (example of a case where a horizontal synchronization signal, which generates a horizontal synchronization period with different numbers of clocks in a predetermined ratio, is generated in a vertical synchronization period)

2. Second Embodiment (example of a case where a horizontal synchronization signal, which generates a horizontal synchronization period with different numbers of clocks in a predetermined ratio, is generated for each unit period which configures a vertical synchronization period)

3. Modified Example

1. First Embodiment

Configuration Example of Imaging Apparatus 21

Figure 1:
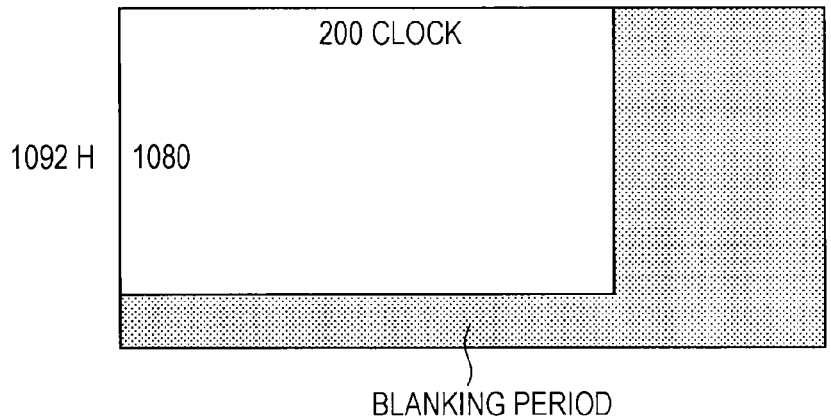
FIG. 1 is a first diagram for describing an adjustment technique in the related art which adjusts a frame rate.
Figure 2:
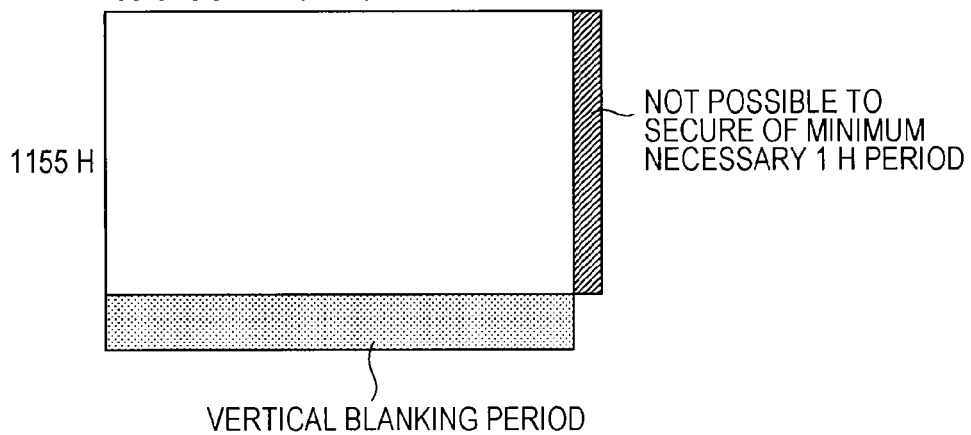
FIG. 2 is a second diagram for describing the adjustment technique in the related art which adjusts a frame rate.
Figure 3:
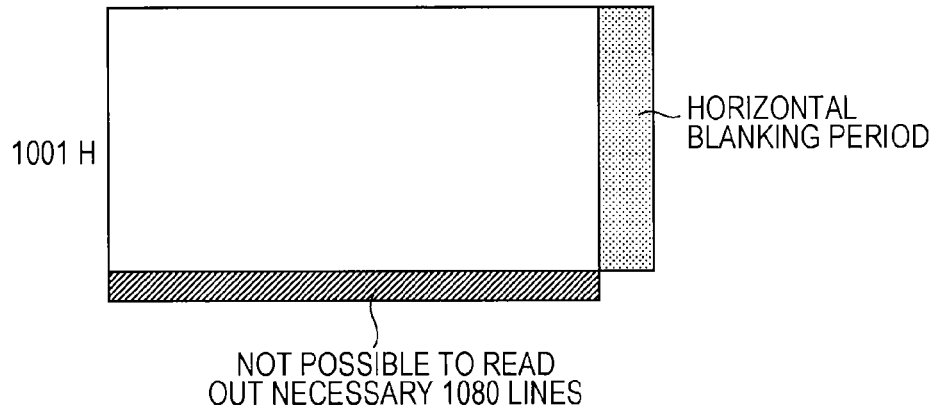
FIG. 3 is a third diagram for describing the adjustment technique in the related art which adjusts a frame rate.
Figure 4:
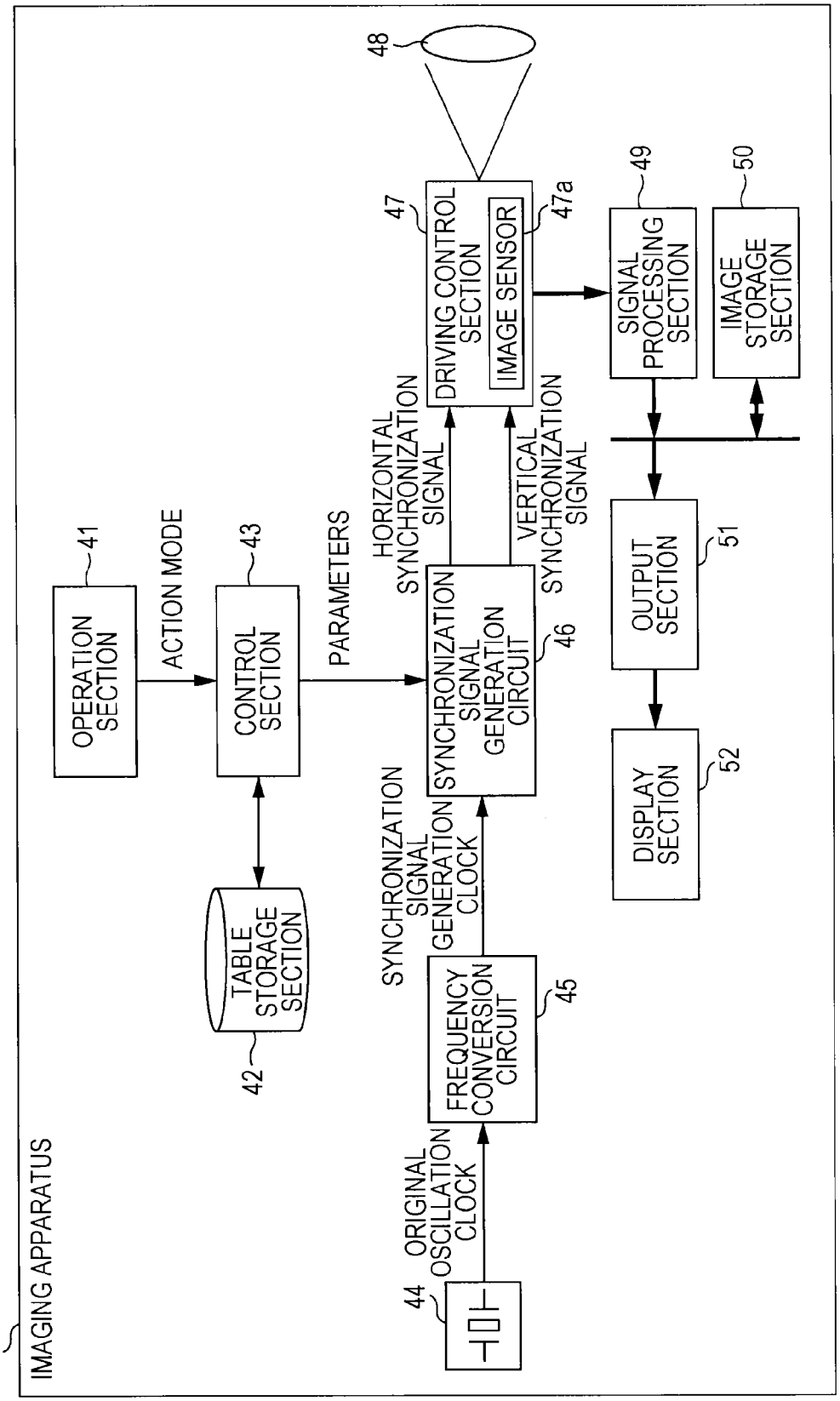
FIG. 4 is a block diagram illustrating a configuration example of an imaging apparatus in a first embodiment.

FIG. 4 shows a configuration example of an imaging apparatus 21 in a first embodiment.

The imaging apparatus 21 is a so-called rolling shutter type (line exposure method) camera and is configured from an operation section 41, a table storage section 42, a control section 43, a clock generation unit 44, a frequency conversion circuit 45, a synchronization signal generation circuit 46, a driving control section 47 with an image sensor 47a built in, an optical system 48, a signal processing section 49, an image storage section 50, an output section 51, and a display section 52.

Here, in particular, the imaging apparatus 21 generates a horizontal synchronization signal which generates horizontal synchronization periods with different numbers of clocks in a predetermined ratio in the synchronization signal generation circuit 46 and reads out an imaging image from the image sensor 47a at a frame rate, a number of lines, a number of pixels, a read out speed, or the like which is desired by the user based on the horizontal synchronization signal which has been generated.

The operation section 41 is, for example, configured from a power button, a release switch, 10 numerical keys, a determination button, and the like and is operated by a user. According to the operation by the user, the operation section 41 supplies a corresponding operation signal to the control section 43.

That is, for example, in a case where the user operates the operation section 41 so that any of a plurality of different operation modes is selected, the operation section 41 supplies an operation signal which corresponds to a selection operation of the user to the control section 43.

Here, an action mode is a mode which represents an action of the image sensor 47a. In the image sensor 47a, the reading out of an imaging image which is obtained by imaging is performed at a frame rate, a number of lines, a number of pixels, a read out speed, or the like according to the action mode which is selected by the user.

The table storage section 42 holds (stores) a management table in advance which manages to correspond to a parameter for activating (driving) the image sensor 47a in the action mode for each of the plurality of different action modes.

FIG. 5 shows an example of the management table. For example, as shown in FIG. 5, parameters such as a decode value decA which represents a number of clocks in a horizontal synchronization period A, a decode value decB which represents a number of clocks in a horizontal synchronization period B which is different to the horizontal synchronization period A by one clock, a threshold which represents the number of the horizontal synchronization periods A appears in a vertical synchronization period and a decode value decV which represents a number of clocks in the vertical synchronization period are managed in the management table for an action mode 1 where a frame formed from 1188 horizontal lines is read out at a frame rate of 239.76 Hz.

Returning to FIG. 4, the control section 43 reads out the parameter which corresponds to the action mode selected by the user out of the plurality of action modes from the table storage section 42 based on the operation signal from the operation section 41 and supplies the parameter to the synchronization signal generation circuit 46.

The clock generation unit 44 is configured by, for example, a crystal oscillator, or the like. For example, the clock generation unit 44 generates a clock at a predetermined clock frequency and supplies the clock to the frequency conversion circuit 45 as an original oscillation clock.

The frequency conversion circuit 45 is, for example, a PLL (phase locked loop) circuit or the like and multiplies the frequency of the original oscillation clock which is supplied from the clock generation unit 44. Due to this, the original oscillation clock is converted into a synchronization signal generation clock with a frequency (for example, a clock frequency of 54 MHz) which is higher than the frequency of the original oscillation clock.

The frequency conversion circuit 45 supplies the synchronization signal generation clock which is acquired by converting the original oscillation clock to the synchronization signal generation circuit 46.

The synchronization signal generation circuit 46 generates a horizontal synchronization signal and a vertical synchronization signal according to the action mode which is selected by the user based on the parameter from the control section 43 and the synchronization signal generation clock from the frequency conversion circuit 45 and supplies the horizontal synchronization signal and the vertical synchronization signal to the driving control section 47.

The driving control section 47 controls the image sensor 47a and performs imaging of the subject and the like in the image sensor 47a based on the horizontal synchronization signal and the vertical synchronization signal from the synchronization signal generation circuit 46.

The image sensor 47a is, for example, an imaging element such as a CCD (charge coupled device image sensor), a CMOS (complementary metal oxide semiconductor) sensor or the like and is activated according to the control from the driving control section 47. That is, for example, the image sensor 47a receives light (an optical image) from a subject which is incidenced via the optical system 48 and outputs an imaging image as an electric signal which is obtained as a result to the signal processing section 49 by synchronizing the horizontal synchronization signal and the vertical synchronization signal which are output from the synchronization signal generation circuit 46.

Specifically, for example, the image sensor 47a performs exposure by receiving an optical image from a subject for each line which configures the imaging sensor 47a by synchronizing the falling edge of the horizontal synchronization signal which is output from the synchronization signal generation circuit 46. Then, the image sensor 47a A/D converts the electric signal which is acquired due to the exposure and reads out the electric signal after the A/D conversion by synchronizing the falling edge of the horizontal synchronization signal which is output from the synchronization signal generation circuit 46.

In addition, the image sensor 47a outputs an imaging image which is read out as an electric signal after A/D conversion to the signal processing section 49 by synchronizing the falling edge of the vertical synchronization signal which is output from the synchronization signal generation circuit 46.

The optical system 48 is configured by a plurality of lenses and the like, collects light from a subject, and incidences the light onto the image sensor 47a as an optical image.

The signal processing section 49 carries out predetermined image processes (for example, reducing noise, correction of hand shaking, and the like) with regard to the imaging image from the image sensor 47a. Then, the signal processing section 49 supplies and stores the imaging image after the image processing in, for example, the image storage section 50. In addition, for example, the signal processing section 49 supplies the imaging image after the image processing to the output section 51.

The image storage section 50 stores the imaging image from the signal processing section 49. The output section 51 supplies and displays the imaging image from the signal processing section 49 in the display section 52.

The display section 52 is, for example, an LCD (liquid crystal display) or the like and displays the imaging image from the output section 51. The display section 52 is used in displaying, for example, an image (a so-called through image) which is used for determining the construction when imaging and the like.

Description of Actions of Synchronization Signal Generation Circuit 46

Next, a concept of a process when the synchronization signal generation circuit 46 generates the vertical synchronization signal and the horizontal synchronization signal for activating the image sensor 47a in the action mode 1 will be described with reference to FIGS. 6 and 7.

Here, the action mode 1 represents a mode for outputting the imaging image as a frame which is configured by 1188 lines to the signal processing section 49 from the image sensor 47a at a frame rate of 239.76 Hz as described above.

For example, in a case where the image sensor 47a is activated in the action mode 1, it is necessary that the image sensor 47a outputs one frame to the signal processing section 49 at intervals of 1/239.76 seconds.

Accordingly, in this case, the synchronization signal generation circuit 46 generates the vertical synchronization signal where a falling edge is generated at intervals of 1/239.76 seconds (vertical synchronization period).

That is, for example, the synchronization signal generation circuit 46 generates a falling edge in the vertical synchronization signal which is output to the image sensor 47a each time the synchronization signal generation clock (referred to below simply as clock) with 225225 ($=54 \times 10^6 \times 1/239.76$) clocks which is equivalent to 1/239.76 seconds is supplied from the frequency conversion circuit 45.

Here, in this case, the clock frequency of the synchronization signal generation clock is 54 MHz and the synchronization signal generation clock with $54 \times 10^6$ clocks in one second is supplied to the synchronization signal generation circuit 46 from the frequency conversion circuit 45.

In addition, for example, in a case where the image sensor 47a is activated in the action mode 1, it is necessary that the image sensor 47a outputs each of 1188 lines which configure one frame in 1/239.76 seconds to the signal processing section 49.

Accordingly, in this case, for example, it is necessary that the synchronization signal generation circuit 46 generates the horizontal synchronization signal which generates the falling edge in each interval of the horizontal synchronization periods formed from at least 1188 periods in 1/239.76 seconds.

Figure 6:
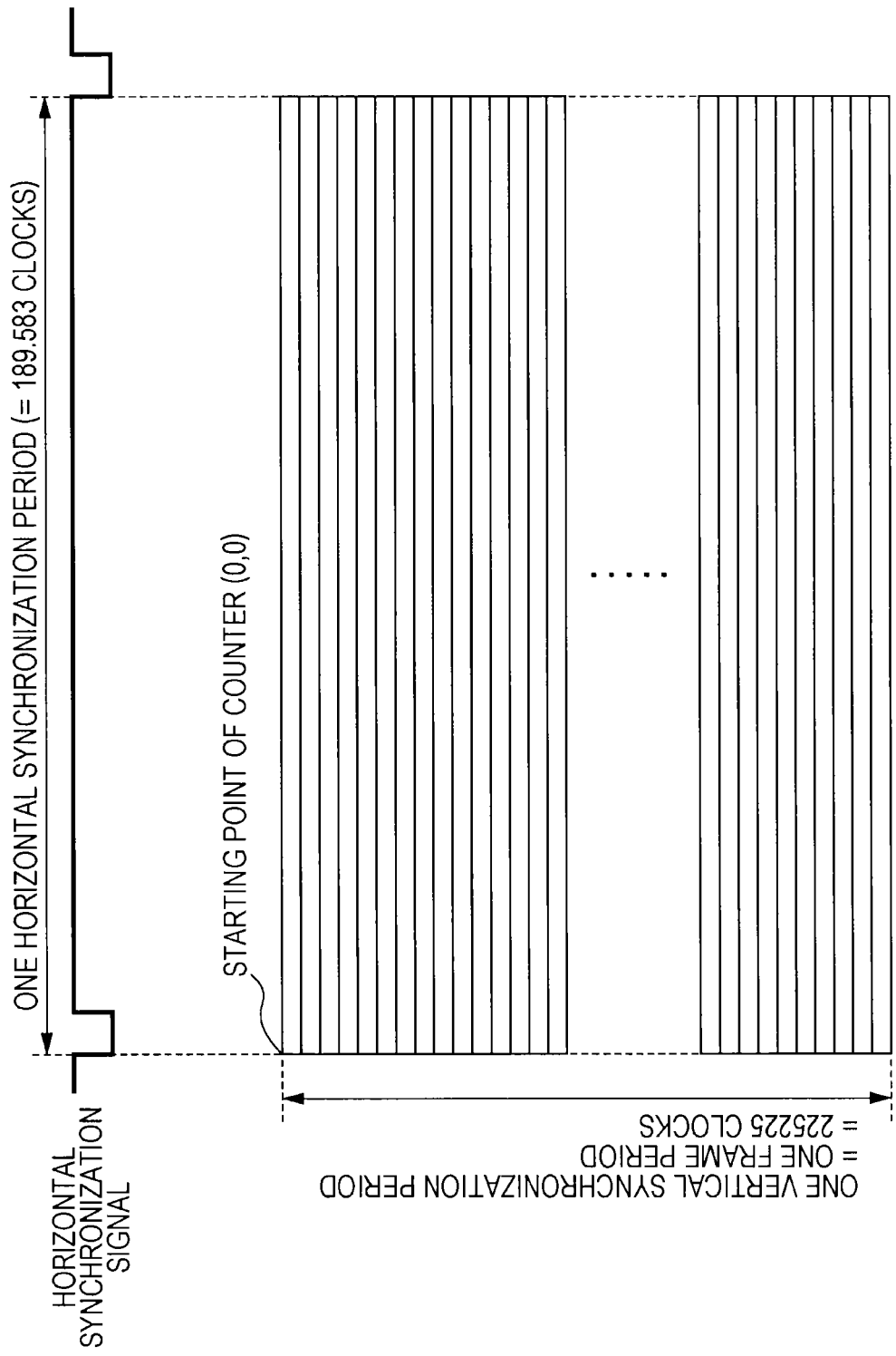
FIG. 6 is a first diagram for describing a concept of a process which is performed by a synchronization signal generation circuit in FIG. 4.

Here, considering the generation of the horizontal synchronization signal which generates the horizontal synchronization period with 1188 periods in 1/239.76 seconds, as shown in FIG. 6, one period of the horizontal synchronization period is set as a period of 189.583 ($=225225/118$) clocks. Here, 189.573 clocks is a value which is obtained by simply dividing 225225 clocks of the vertical synchronization period by 1188 which is the total number of lines which configures one frame.

Here, it is necessary that the following first to fourth conditions are satisfied also with regard to the vertical synchronization signal and the horizontal synchronization signal which are generated by the synchronization signal generation circuit 46.

As a first condition, it is necessary that the vertical synchronization period which represents an interval with regard to falling edges which are generated in the vertical synchronization signal, that is, one frame period which represents an interval where an imaging image is read out being 225225 (=54×10$^6$/239.76) clocks is satisfied. Here, the frequency of the clock is set at 54 MHz.

As a second condition, it is necessary that the horizontal synchronization period which represents an interval with regard to falling edges which are generated in the horizontal synchronization period is set as a period of n clocks or more due to limiting A/D conversion which is performed by the image sensor 47a, a transfer rate when transferring the imaging image, or the like. Here, the method for determining the n clocks will be described later with reference to FIGS. 11 and 12.

As a third condition, it is necessary that the vertical synchronization period and the horizontal synchronization period each represent a number of clocks which is an integer.

As a fourth condition, it is necessary that the number of horizontal synchronization periods in the vertical synchronization period is 1188, which is the number of lines which configure the imaging image, or more.

However, as shown in FIG. 6, since one period of the horizontal synchronization period is 189.583 clocks and this is not a positive integer, the third condition described above is not satisfied. As a result, it is difficult to adopt 189.583 clocks as one period of the horizontal synchronization period.

Accordingly, as described using FIG. 7 later, in the synchronization signal generation circuit 46, for example, the horizontal synchronization signal which generates the 1188 periods of horizontal synchronization periods where each of the horizontal synchronization signal which are different by only one clock are in a mixed state in one period of the vertical synchronization period. Here, as shown in FIG. 7, 1188 periods of horizontal synchronization periods are in a mixed state where the ratio of the horizontal synchronization period A with 190 clocks and the horizontal synchronization period B with 189 clocks is 7:5.

Here, in a case where the number of clocks which represents one period of the vertical synchronization period is divided by the total number of periods 1188 on the horizontal synchronization periods, that is, the number of clocks in one period of the horizontal synchronization period is a positive integer, it is sufficient if the horizontal synchronization signal, which generates the 1188 periods of the horizontal synchronization period which is the calculated number of clocks, is generated.

Figure 7:
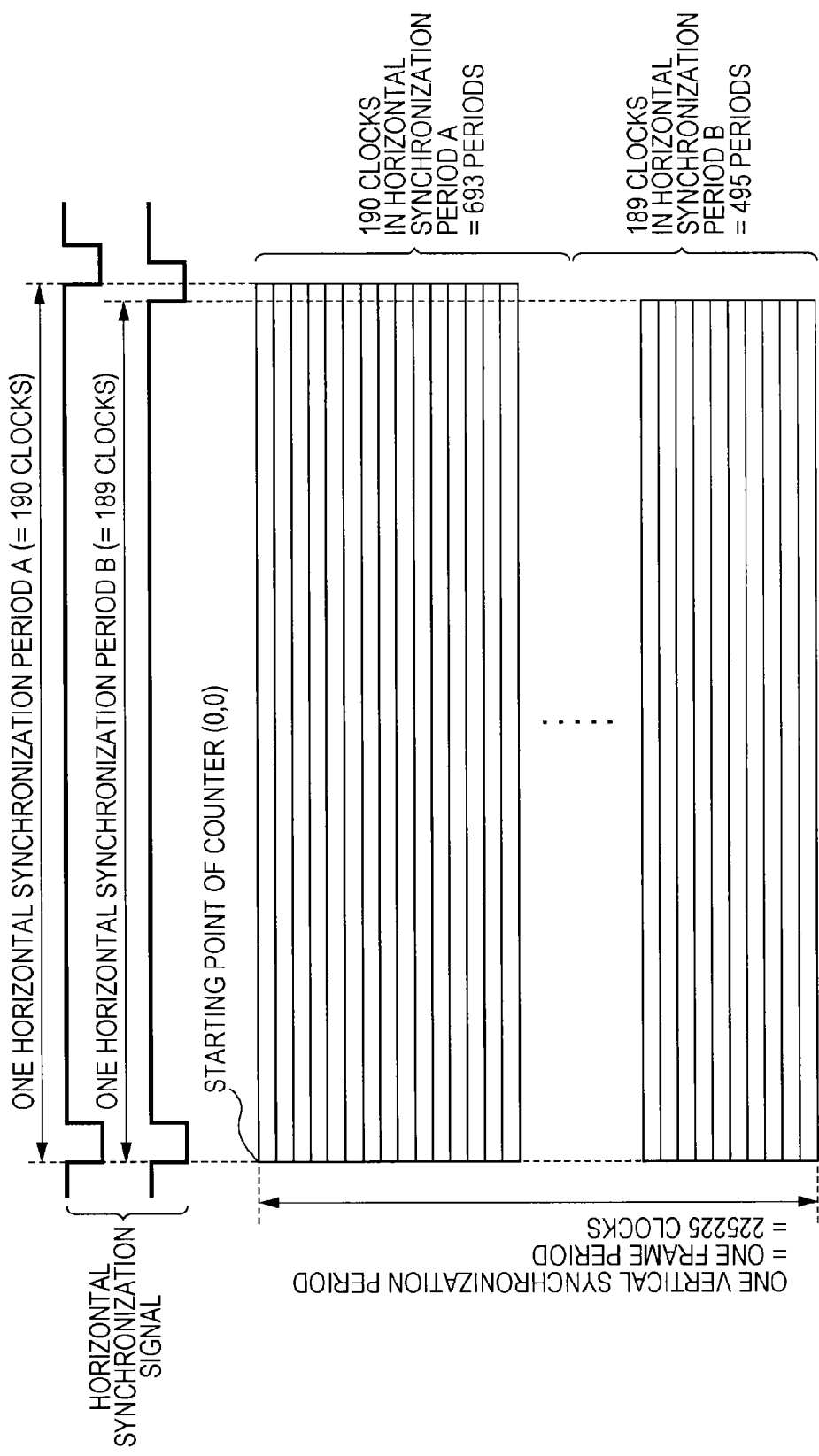
FIG. 7 is a second diagram for describing a concept of a process which is performed by a synchronization signal generation circuit in FIG. 4.

Next, FIG. 7 shows an example when the synchronization signal generation circuit 46 generates the horizontal synchronization signal which generates 693 periods of the horizontal synchronization period A and 495 periods of the horizontal synchronization period B in one period of the vertical synchronization period in a case where the result of the division, which is obtained by dividing the vertical synchronization period by the total number of lines which configure the imaging image, is not a positive integer.

The synchronization signal generation circuit 46 calculates a surplus clock s using the following expression (1) in a case where the number of clocks which represents one period of the horizontal synchronization period is set at 190 clocks which is obtained by rounding up from 189.583 clocks.

$$s = \{INT(225225/1188)+1\} \times 1188 - 225225 = 190 \times 1188 - 225225 = 495 \tag{1}$$

Here, in expression (1), INT( ) represents the integer part of the value in the brackets. In addition, the surplus clock s represents the number of clocks in the horizontal synchronization period A which are not contained within the 225225 clocks of the vertical synchronization period in a case where the horizontal synchronization period A with 190 clocks is set as 1188 periods.

In the case where the horizontal synchronization period A with 190 clocks is set as 1188 periods, the total number of clocks in the horizontal synchronization period A with 1188 periods is 225720 (=190×1188) clocks and this is 495 clocks more than the 225225 clocks in the vertical synchronization period.

In this case, unevenness occurs in the exposure accumulation time which is necessary for the exposure of each line which configures the image sensor 47a, and as such, unevenness in the luminance occurs in the imaging image caused by the 225225 clocks in the vertical synchronization period not being an integer multiple of the 190 clocks of the horizontal synchronization period A. Here, the cause for the occurrence of unevenness in the exposure accumulation time will be described in detail with reference to FIGS. 8 and 9.

Therefore, by setting 495 periods of the horizontal synchronization periods A as the horizontal synchronization periods B with 189 clocks which is only one clock lower out of the 1188 periods of the horizontal synchronization periods A, the total number of clocks in the horizontal synchronization period with 1188 periods is 225225 clocks.

That is, for example, as shown in FIG. 7, the ratio of the horizontal synchronization period A with 190 clocks and the horizontal synchronization period B with 189 clocks is 7:5. Due to this, the timing of the completion of the vertical synchronization period and the timing of the completion of 1188$^{th}$ horizontal synchronization period B out of the horizontal synchronization periods with 1188 periods in the vertical synchronization period match.

Specifically, for example, as shown in FIG. 7, the horizontal synchronization signal generates a falling edge so that 693 (=1188×7/12) periods of the horizontal synchronization periods A and 495 (=1188×5/12) periods of the horizontal synchronization periods B are generated in one period of the vertical synchronization period.

Here, the parameter which is calculated in advance using the calculation method which is described with reference to FIG. 7 is held in a form of being managed in a management table in the table storage section 42.

That is, for example, in the table storage section 42, the 225225 clocks of the vertical synchronization period is held as the decode value decV of the vertical synchronization period and the 190 clocks of the horizontal synchronization period A is held as the decode value decA of the horizontal synchronization period A.

In addition, for example, in the table storage section 42, the 189 clocks of the horizontal synchronization period B is held as the decode value decB of the horizontal synchronization period B and the 693 periods of the horizontal synchronization period A is held as the threshold.

Next, the occurrence of unevenness in the exposure accumulation time caused by the x clocks of the vertical synchronization period not matching the total number of a clocks of the horizontal synchronization periods will be described with reference to FIGS. 8 and 9.

Figure 8:
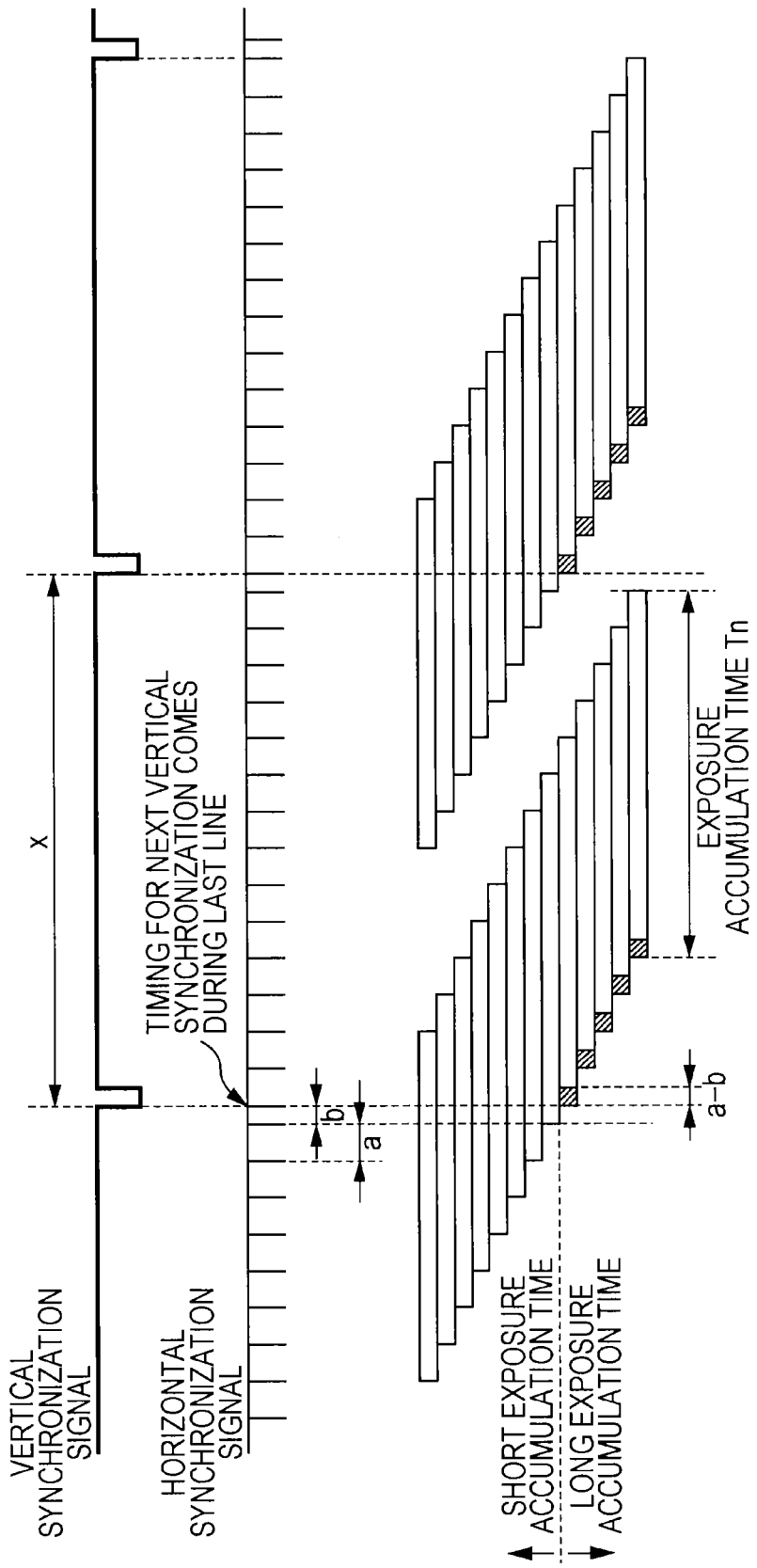
FIG. 8 is a diagram for describing a cause for the occurrence of uneven luminance.

FIG. 8 shows a concept of a process which is performed by the image sensor 47a in a case where one period of the vertical synchronization period (intervals of the falling edges which are generated in the vertical synchronization signal) is x clocks and one period of the horizontal synchronization period (intervals of the falling edges which are generated in the horizontal synchronization signal) is a clocks.

At the upper side of FIG. 8, the vertical synchronization signal where a falling edge is generated (frame read-out timing) at a cycle of x clocks is shown.

In addition, at the center of FIG. 8, the horizontal synchronization signal where a falling edge is generated at a cycle of a clocks is shown.

Furthermore, at the lower side of FIG. 8, an exposure accumulation time Tn for each of the $n^{th}$ lines n which configures the image sensor 47a is shown. Here, in FIG. 8, in order from above, an exposure accumulation time T1 of the $1^{st}$ line, an exposure accumulation time T2 of the $2^{nd}$ line, . . . , and an exposure accumulation time TN of the $N^{th}$ line are shown.

In the $n^{th}$ line, each exposure starts at the timing when the falling edge is generated in the horizontal synchronization signal, that is, the timing when the horizontal synchronization period starts.

Here, at the lower side of FIG. 8, in order to avoid complexity in the diagram, only the exposure accumulation times of the $1^{st}$ to the $13^{th}$ lines are shown.

In FIG. 8, the result of the division x/a which is obtained by dividing the x clocks of the vertical synchronization period by the a clocks of the horizontal synchronization period is not an integer. That is, the relationship of x=an (n is a positive integer) is not satisfied.

As a result, in the one period of the vertical synchronization period, the next vertical synchronization period starts during the completion of the last horizontal synchronization period. That is, for example, as shown in FIG. 8, in the last horizontal synchronization period of the one period of the vertical synchronization period, the next vertical synchronization period starts with b clocks which is less than a clocks.

In addition, the exposure accumulation time is measured according to the number of horizontal synchronization periods. Accordingly, for example, the exposure accumulation time is set as 10 periods of the horizontal synchronization period which includes a predetermined horizontal synchronization period from the starting of the predetermined horizontal synchronization period as shown at the lower side of FIG. 8.

As a result, for example, in FIG. 8, the exposure accumulation time where exposure is performed over x vertical synchronization periods is set as (9a+b) clocks and the exposure accumulation time where exposure is performed within the vertical synchronization period is 10a clocks.

Accordingly, as shown at the lower side of FIG. 8, the exposure is performed with the exposure accumulation time of (9a+b) clocks which is relative short in each line from the $1^{st}$ to the $8^{th}$, and the exposure is performed with the exposure accumulation time of 10a clocks which is relative long in each line from the $9^{th}$ to the $13^{th}$.

In this manner, in FIG. 8, in each line from the $1^{st}$ to the $8^{th}$ and in each line from the $9^{th}$ to the $13^{th}$, the exposure accumulation time is different by only (a−b) clocks.

Figure 9:
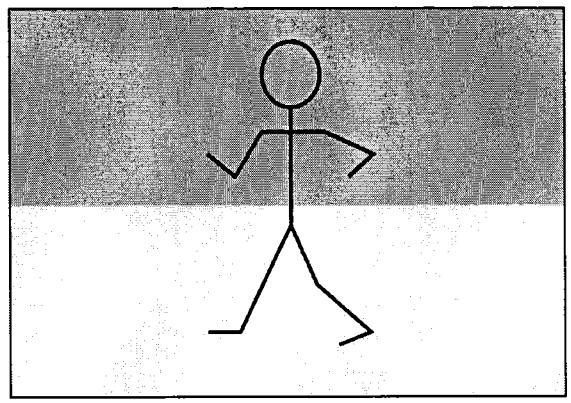
FIG. 9 is a diagram illustrating an example of an imaging image where uneven luminance has occurred.

As a result, in the imaging image which is read out from the image sensor 47a, for example, the luminance in the upper half and the luminance in the lower half are considerably different as shown in FIG. 9 due to the difference in the exposure accumulation time in each line from the $1^{st}$ to the $8^{th}$ and in each line from the $9^{th}$ to the $13^{th}$.

Therefore, in the present disclosure, the uneven luminance is prevented as shown in FIG. 9 by the completion timing of the vertical synchronization period and the completion timing of the last horizontal synchronization period in the vertical synchronization period being matched.

Description of Actions of Image Sensor 47a

Figure 10:
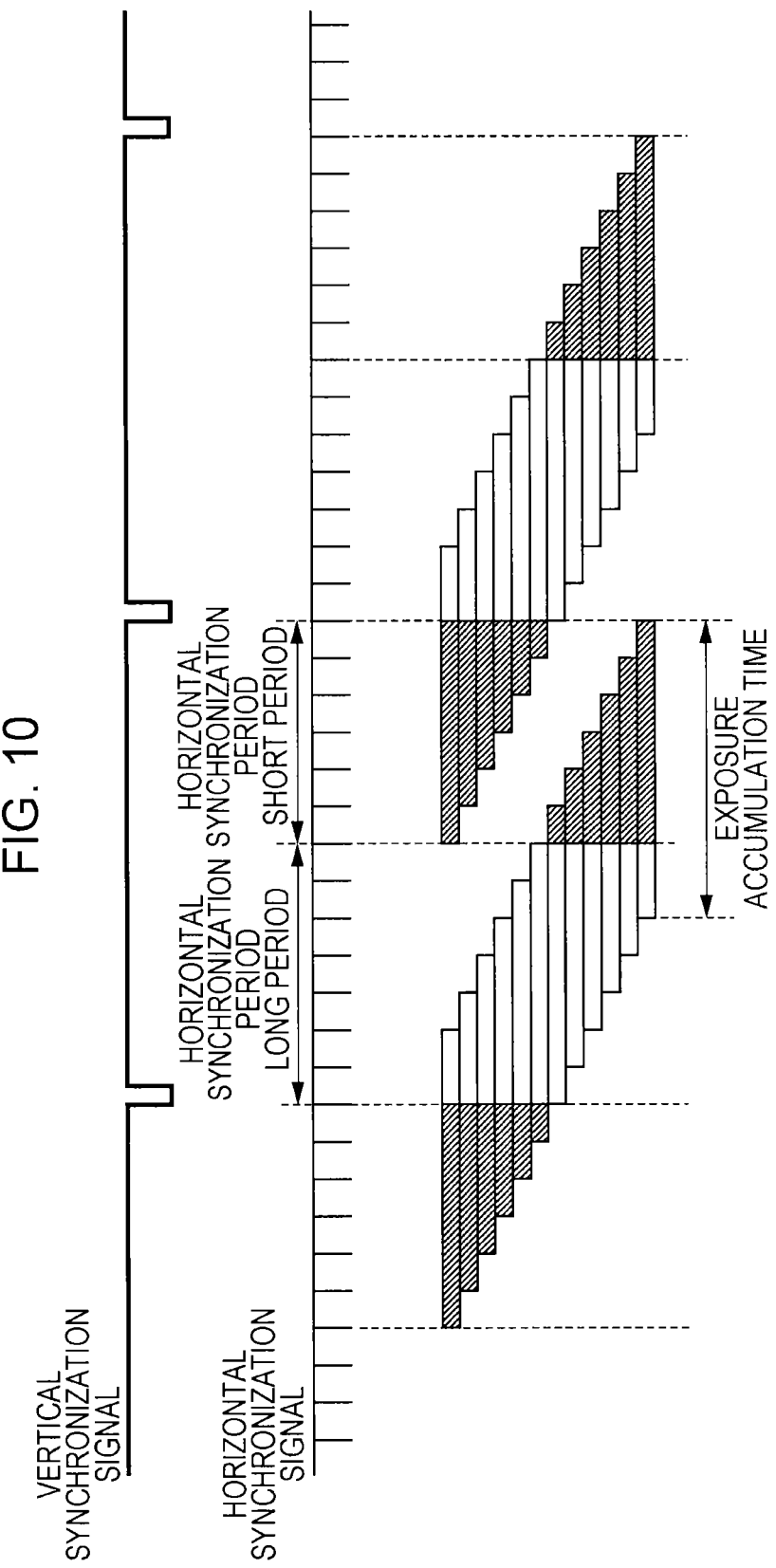
FIG. 10 is a diagram illustrating an example of an action of an image sensor.

Next, FIG. 10 shows an example in case where the image sensor 47a performs exposure, reading out, or the like by synchronizing the vertical synchronization signal and the horizontal synchronization signal.

As shown in FIG. 10, the horizontal synchronization signal, which generates a plurality of short horizontal synchronization periods after generating a plurality of long horizontal synchronization periods in the vertical synchronization period, is supplied in the driving control section 47 from the synchronization signal generation circuit 46.

That is, for example, the horizontal synchronization signal, which generates 495 periods of the horizontal synchronization periods B after generating 693 periods of the horizontal synchronization periods A in the vertical synchronization period, is supplied in the driving control section 47 from the synchronization signal generation circuit 46 as described with reference to FIG. 7. The horizontal synchronization signal is a signal where a falling edge is generated at timings of the starting of each of the horizontal synchronization periods A and the horizontal synchronization periods B. As shown in FIG. 10, the image sensor 47a starts the exposure for each line which configures the image sensor 47a by synchronizing the falling edge which is generated in the horizontal synchronization signal which is output by the synchronization signal generation circuit 46.

Due to this, the horizontal synchronization signal, which matches the completion timing of the vertical synchronization period and the completion timing of the last horizontal synchronization period in the vertical synchronization period, and the horizontal synchronization signal and the vertical synchronization signal are supplied in the driving control section 47 from the synchronization signal generation circuit 46. As such, in the imaging apparatus 21, it is possible to prevent the generation of uneven luminance as shown in FIG. 9 in the imaging image which is output from the image sensor 47a.

Next, the method for determining n clocks in the second condition where the horizontal synchronization period is set to be a number of clocks which is equal to or more than n clocks will be described with reference to FIGS. 11 and 12.

Figure 11:
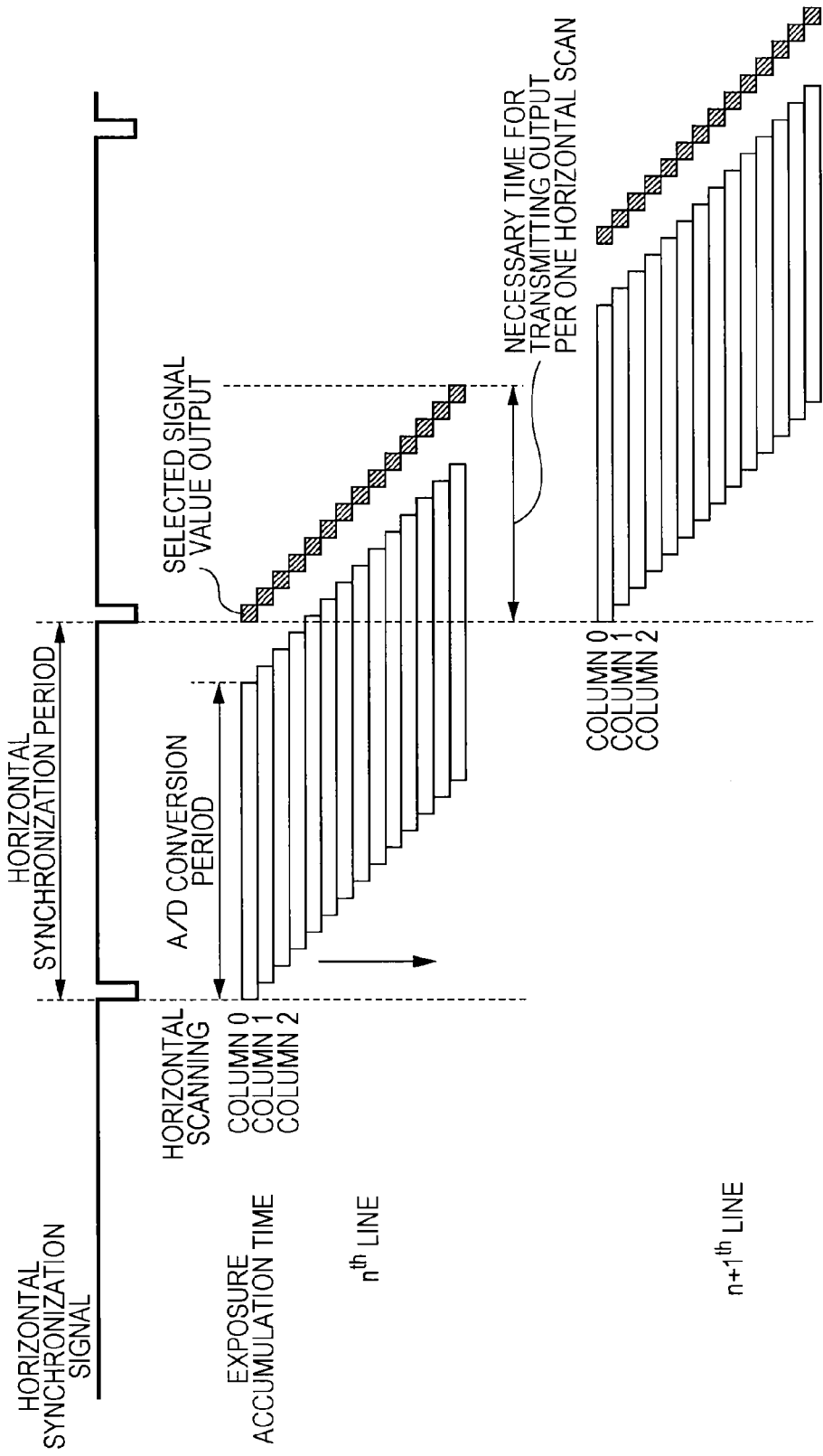
FIG. 11 is a first diagram illustrating an example of a condition which the horizontal synchronization signal is to satisfy.

As shown in FIG. 11, the exposure is performed by each light receiving element (which correspond to columns 0, 1, 2, . . . ) which configures the $n^{th}$ line included in the image sensor 47a in the horizontal synchronization periods representing intervals of the falling edges which are generated in the horizontal synchronization signal.

Then, in the next horizontal synchronization period, the A/D conversion of the voltage value which is obtained from each light receiving element which configures the $n^{th}$ line is performed in each A/D conversion period. The voltage value after the A/D conversion is output as a signal value in the next horizontal synchronization period.

Figure 12:
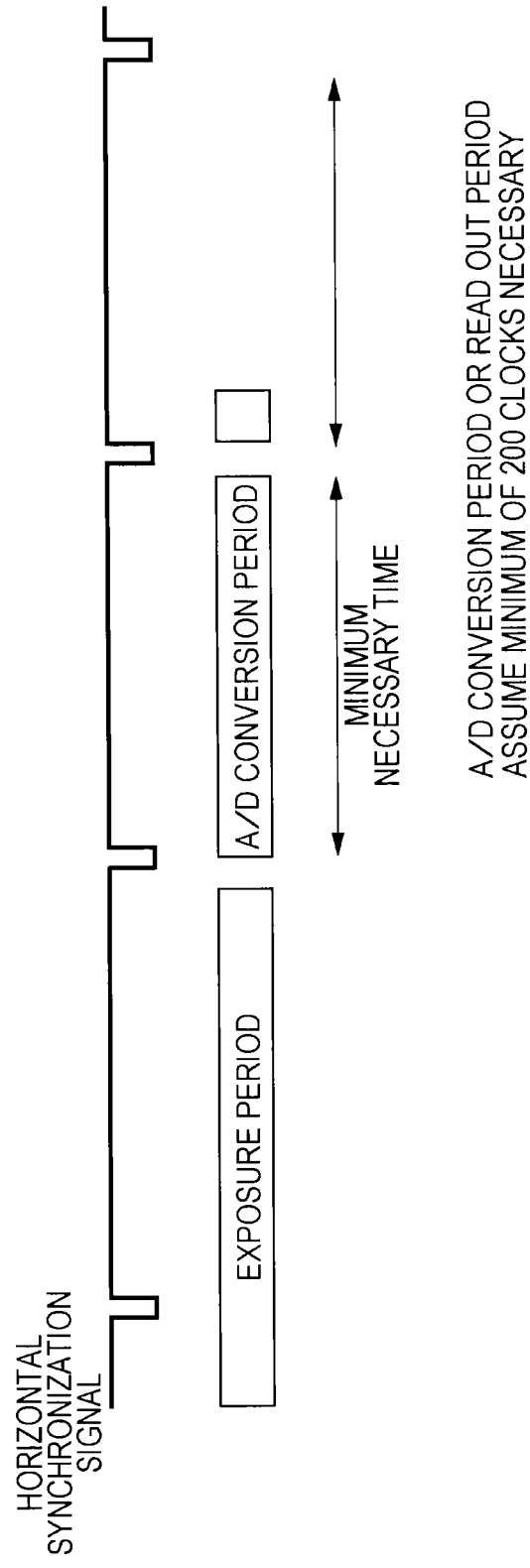
FIG. 12 is a second diagram illustrating an example of a condition which the horizontal synchronization signal is to satisfy.

Here, for example, as shown in FIG. 12, it is necessary to adopt n clocks which are the minimum necessary to reliably execute the A/D conversion as the A/D conversion period. Here, n clocks is determined in advance based on the performance of the image sensor 47a and the like. This is the same for the signal output periods which are necessary for the output of the signal value.

Accordingly, for example, in a case where either of the A/D conversion period and the signal output period is a number of clocks which is 200 clocks or less, the clocks n is set as, for example, n=200.

Since described with reference to FIGS. 11 and 12, it is necessary to satisfy the condition such as the number of clocks being n clocks or more, so that it is possible to reliably perform A/D conversion and the output of the signal value, in the horizontal synchronization period as the second condition.

Detailed Configuration Example of Synchronization Signal Generation Circuit 46

Figure 13:
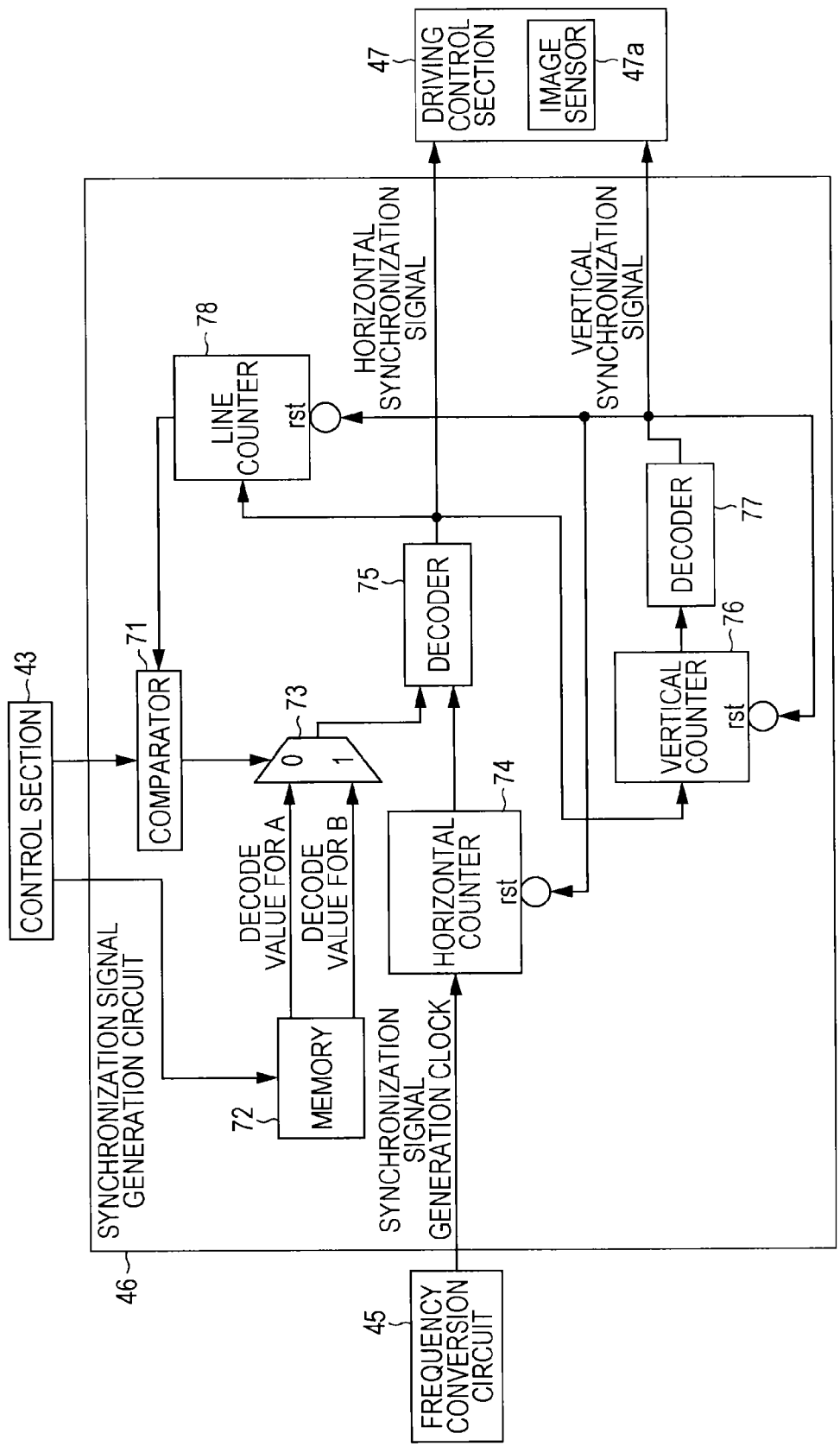
FIG. 13 is a block diagram illustrating a detailed configuration example of a synchronization signal generation circuit in FIG. 4.

Next, FIG. 13 shows a detailed configuration example of the synchronization signal generation circuit 46.

The synchronization signal generation circuit 46 is configured from a comparison unit 71, a memory 72, a selection unit 73, a horizontal counter 74, a decoder 75, a vertical counter 76, a decoder 77, and a line counter 78.

The threshold as the parameter from the control section 43 is supplied in the comparison unit 71. The comparison unit 71 compares a line count value from the line counter 78 and the threshold from the control section 43 each time the line count value is supplied from the line counter 78. Here, the line count value represents the total number of falling edges which are generated in the horizontal synchronization signal in the vertical synchronization period.

Then, the comparison unit 71 supplies a value 0 to the selection unit 73 in a case where a comparison result such that the line count value is the threshold or lower is acquired. In addition, the comparison unit 71 supplies a value 1 to the selection unit 73 in a case where a comparison result such that the line count value is larger than the threshold is acquired.

The decode value decA (=190) of the horizontal synchronization period A and the decode value decB (=189) of the horizontal synchronization period B are supplied as the parameters from the control section 43 to the memory 72. Then, the memory 72 temporarily holds the decode value decA and the decode value decB from the control section 43 according to the control from the control section 43.

The selection unit 73 reads out the decode value decA from the memory 72 and outputs the decode value decA to the decoder 75 in a case where the value 0 is supplied from the comparison unit 71. In addition, the selection unit 73 reads out the decode value decB from the memory 72 and outputs the decode value decB to the decoder 75 in a case where the value 1 is supplied from the comparison unit 71.

The horizontal counter 74 adds one (increments) to a horizontal count value each time one clock is supplied from the frequency conversion circuit 45 and the new horizontal count value which is acquired as a result is supplied to the decoder 75.

Here, the horizontal count value is set to zero in advance. In addition, for example, the x value of the count starting point (x, y)=(0, 0) shown in FIG. 7 represents the horizontal count value. Furthermore, the y value of the count starting point (x, y)=(0, 0) represents a vertical count value which will be described later.

In addition, the horizontal counter 74 resets (changes) the horizontal count value to zero at a timing where the falling edge is generated in the vertical synchronization signal based on the vertical synchronization signal from the decoder 77.

The decoder 75 generates the horizontal synchronization signal where a falling edge pulse is generated with a cycle of the number of clocks which represents the decode value based on the decode value from the selection unit 73.

That is, for example, in a case where the decode value decA (=190) is supplied to the decoder 75 from the selection unit 73, the decoder 75 determines whether or not the decode value decA (=190) from the selection unit 73 matches with the horizontal count value from the horizontal counter 74.

Then, in a case where the decoder 75 has determined that the decode value decA and the horizontal count value match, the falling edge is generated in the horizontal synchronization signal. Due to this, the interval of the falling edge which is generated in the horizontal synchronization signal is set as the horizontal synchronization period A where 190 clocks which represents the decode value decA is one cycle.

Here, also in a case where the decode value decB (=189) is supplied to the decoder 75 from the selection unit 73, the decoder 75 generates the horizontal synchronization period B in the same manner as the case where the decode value decA is supplied.

That is, in a case where the decoder 75 has determined that the decode value decB and the horizontal count value match, the falling edge is generated in the horizontal synchronization signal. Due to this, the interval of the falling edge which is generated in the horizontal synchronization signal is set as the horizontal synchronization period B where 189 clocks which represents the decode value decB is one cycle.

The decoder 75 supplies the horizontal synchronization signal which has been generated to the vertical counter 76, the line counter 78, and the driving control section 47.

The vertical counter 76 adds one (increments) to the vertical count value each time the fall edge is generated by the horizontal synchronization signal which is supplied from the decoder 75 and the new vertical count value which is acquired as a result is supplied to the decoder 77. That is, the vertical counter 76 adds the horizontal synchronization period in one period of the vertical synchronization period as the vertical count value.

In addition, the vertical counter 76 resets (changes) the vertical count value to zero at a timing where the falling edge is generated in the vertical synchronization signal based on the vertical synchronization signal from the decoder 77. That is, the vertical counter 76 resets the vertical count value to zero at a timing when the vertical synchronization period is completed and the next vertical synchronization period starts.

The decode value decV (=225225) is supplied to the decoder 77 in the vertical synchronization period as the parameter from the control section 43. Here, in order to avoid complexity in the diagram in FIG. 13, the diagrammatical representation of the signal line from the control section 43 to the decoder 77 is omitted.

The decoder 77 generates the vertical synchronization signal where a falling pulse is generated at a cycle which is represented by the decode value decV based on the decode value decV from the control section 43.

That is, for example, the decoder 77 determines whether or not the decode value decV from the control section 43 matches with the vertical count value from the vertical counter 76.

Then, in a case where the decoder 77 has determined that the decode value decV and the vertical count value match, the falling edge is generated in the vertical synchronization signal. Due to this, the interval of the falling edge which is generated in the vertical synchronization signal is set as the vertical synchronization period where 225225 clocks which represents the decode value decV is one cycle.

The decoder 77 supplies the vertical synchronization signal which has been generated to the horizontal counter 74, the vertical counter 76, the line counter 78, and the driving control section 47.

The line counter 78 adds one (increments) to a line count value each time the falling edge is generated in the horizontal synchronization signal which is supplied from the decoder 75 and the new line count value which is acquired as a result is supplied to the comparison unit 71.

In addition, the line counter 78 resets (changes) the line count value to the value 0 at a timing where the falling edge is generated in the vertical synchronization signal which is supplied from the decoder 77.

Description of Action of Imaging Apparatus 21

Next, the imaging process which is performed by the imaging apparatus 21 will be described with reference to the flowchart of FIG. 14.

Figure 14:
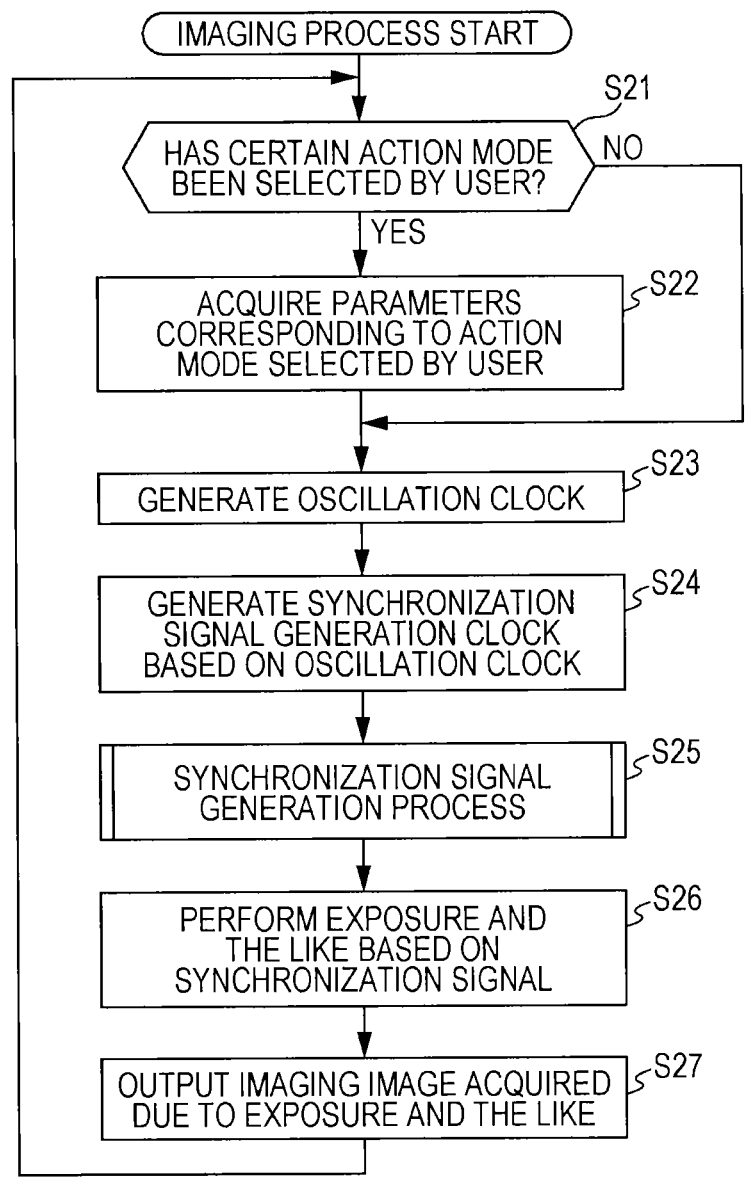
FIG. 14 is a flowchart for describing an imaging process which is performed by the imaging apparatus in FIG. 4.

The imaging process of FIG. 14 is started when, for example, an operation where the power of the imaging apparatus 21 is turned on or the like is performed by the user operating the operation section 41.

In step S21, the control section 43 determines whether or not a selection operation where a predetermined action mode is selected by the user operating the operation section 41 has been performed according to the operation signal from the operation section 41. Then, in a case where the control section 43 determines that the selection operation has been performed by the user according to the operation signal from the operation section 41, the process progresses to step S22.

In step S22, the control section 43 reads out the parameter, which corresponds to the action mode which has been selected using the selection operation by the user, from the management table which is held in the table storage section 42 and supplies the parameter to the synchronization signal generation circuit 46.

Here, in step S21, in a case where the control section 43 determines that the selection operation has not been performed by the user according to the operation signal from the operation section 41, step S22 is skipped and the process progresses to step S23.

At this time, from when the imaging process of FIG. 14 is started, in a case where the selection operation by the user has yet to be performed, the control section 43 reads out the parameter, which corresponds to the action mode which has been determined in advance, from the management table which is held in the table storage section 42 and supplies the parameter to the synchronization signal generation circuit 46.

In step S23, for example, the clock generation unit 44 generates a clock at a predetermined clock frequency and supplies the clock to the frequency conversion circuit 45 as the original oscillation clock.

In step S24, the frequency conversion circuit 45 multiplies the frequency of the original oscillation clock which is supplied from the clock generation unit 44. Due to this, the original oscillation clock is converted into a synchronization signal generation clock with a frequency (for example, a clock frequency of 54 MHz) which is higher than the frequency of the original oscillation clock.

Then, the frequency conversion circuit 45 supplies the synchronization signal generation clock which is acquired by converting the original oscillation clock to the synchronization signal generation circuit 46.

In step S25, the synchronization signal generation circuit 46 performs a synchronization signal generation process where the horizontal synchronization signal and the vertical synchronization signal are generated according to the action mode which is selected by the user based on the parameter from the control section 43 and the synchronization signal generation clock from the frequency conversion circuit 45. Here, the details of the synchronization signal generation process will be described later with reference to the flowchart of FIG. 15.

The synchronization signal generation circuit 46 supplies the horizontal synchronization signal and the vertical synchronization signal which are acquired due to the synchronization signal generation process to the driving control section 47.

Here, after the process has progressed from step S25 to step S26, the synchronization signal generation circuit 46 continues to execute the synchronization signal generation process based on the parameter which has been supplied from the control section 43. Accordingly, the horizontal synchronization signal and the vertical synchronization signal are constantly supplied from the synchronization signal generation circuit 46 to the driving control section 47.

In step S26, the driving control section 47 controls the image sensor 47a based on the horizontal synchronization signal and the vertical synchronization signal from the synchronization signal generation circuit 46.

Due to this, the image sensor 47a starts the exposure for each line which configures the image sensor 47a by synchronizing the falling edge which is generated in the horizontal synchronization signal which is output by the synchronization signal generation circuit 46 according to the control from the driving control section 47.

In addition, the image sensor 47a reads out the A/D conversion of the voltage value which is acquired due to the exposure and the voltage value after the A/D conversion as the signal values by synchronizing the falling edge which is generated in the horizontal synchronization signal which is output from the synchronization signal generation circuit 46.

Furthermore, in step S27, the image sensor 47a outputs the imaging image as an electric signal which is acquired due to the exposure and the like to the signal processing section 49 by synchronizing the falling edge which is generated in the vertical synchronization signal which is output from the synchronization signal generation circuit 46 (the falling edge which is generated at a timing of the starting of the vertical synchronization period). After this, the process returns to step S21, and beyond this, the process is performed in the same manner.

Here, for example, the imaging process of FIG. 14 is completed when an operation which cancels the imaging of the subject by the imaging sensor 47a is performed by the user operating the operation section 41 or the like.

Details of Synchronization Signal Generation Process

The details of the synchronization signal generation process in step S25 of FIG. 14 will be described with reference to the flowchart of FIG. 15.

In step S41, the comparison unit 71 compares the line count value from the line counter 78 and the threshold from the control section 43 each time the line count value is supplied from the line counter 78 and the comparison result is supplied to the selection unit 73.

Specifically, for example, the comparison unit 71 supplies the value 0 to the selection unit 73 in a case where a comparison result such that the line count value is the threshold or lower is acquired. In addition, for example, the comparison unit 71 supplies a value 1 to the selection unit 73 in a case where a comparison result such that the line count value is larger than the threshold is acquired.

In step S41, in a case where the comparison unit 71 has acquired a comparison result such that the line count value is the threshold or lower, the process progresses to step S42. In step S42, the selection unit 73 reads out the decode value decA from the memory 72 and outputs the decode value decA to the decoder 75 to correspond to the supplying of the value 0 from the comparison unit 71.

In step S41, in a case where the comparison unit 71 has acquired a comparison result such that the line count value is larger than the threshold, the process progresses to step S43. In step S43, the selection unit 73 reads out the decode value decB from the memory 72 and outputs the decode value decB to the decoder 75 to correspond to the supplying of the value 1 from the comparison unit 71.

In step S44, the horizontal line counter 74 adds one (increments) to the horizontal count value each time one clock is supplied from the frequency conversion circuit 45 and the new horizontal count value which is acquired as a result is supplied to the decoder 75.

In step S45, the decoder 75 generates the horizontal synchronization signal where a falling pulse is generated with a cycle which represents the decode value based on the decode value from the selection unit 73 and the horizontal count value from the horizontal counter 74 and the horizontal synchronization signal is supplied to the vertical counter 76, the line counter 78, and the driving control section 47.

In step S46, the vertical counter 76 adds one (increments) to the vertical count value each time the fall edge is generated by the horizontal synchronization signal which is supplied from the decoder 75 and the new vertical count value which is acquired as a result is supplied to the decoder 77.

In step S47, the decoder 77 generates the vertical synchronization signal where a falling edge is generated at a cycle which is represented by the decode value decV based on the decode value decV from the control section 43 and the vertical count value from the vertical counter 76. Then, the decoder 77 supplies the vertical synchronization signal which has been generated to the horizontal counter 74, the vertical counter 76, the line counter 78, and the driving control section 47.

Here, the decode value decV (=225225) of the vertical synchronization period is supplied to the decoder 77 as the parameter from the control section 43.

In step S48, the line counter 78 adds one (increments) to the line count value each time the falling edge is generated in the horizontal synchronization signal which is supplied from the decoder 75 and the new line count value which is acquired as a result is supplied to the comparison unit 71.

In step S49, in a case where the decoder 77 outputs the vertical synchronization signal without generating the falling edge, the process returns to step S41, and beyond this, the process is performed in the same manner.

In addition, in step S49, the process progresses to step S50 to correspond to the decoder 77 outputting of the vertical synchronization signal where the falling edge is generated.

In step S50, the vertical counter 76 resets (changes) the vertical count value to the value 0 at a timing where the falling edge is generated in the vertical synchronization signal based on the vertical synchronization signal which is supplied from the decoder 77.

In step S51, the horizontal counter 74 resets (changes) the horizontal count value to the value 0 at a timing where the falling edge is generated in the vertical synchronization signal based on the vertical synchronization signal which is supplied from the decoder 77.

In step S52, the line counter 78 resets (changes) the line count value to the value 0 at a timing where the falling edge is generated in the vertical synchronization signal based on the vertical synchronization signal which is supplied from the decoder 77 and the process returns to step S41. In step S41 and beyond this, the process is performed in the same manner.

As described above, according to the imaging process of FIG. 14, the first to fourth conditions which are necessary for the actions of the image sensor 47a are satisfied and the horizontal synchronization signal and the vertical synchronization signal are generated for driving in the action mode which is desired by the user. As a result, it is possible to drive the image sensor 47a in the action mode which is desired by the user.

In addition, according to the imaging process of FIG. 14, the vertical synchronization signal and the horizontal synchronization signal are generated so as to match the timing of the generation of the falling edge of the vertical synchronization signal which is generated with the completion timing where the vertical synchronization period is completed and the falling edge of the horizontal synchronization signal which is generated with the completion timing where the last horizontal synchronization period is completed in the vertical synchronization period.

As a result, as shown in FIG. 8, it is possible to prevent a situation where considerable uneven luminance as shown in FIG. 9 occurs in the imaging image caused by the timing of the generation of the falling edge of the vertical synchronization signal which is generated with the completion timing where the vertical synchronization period is completed and the falling edge of the horizontal synchronization signal which is generated with the completion timing where the last horizontal synchronization period is completed in the vertical synchronization period not matching.

Here, in the first embodiment, uneven luminance as shown in FIG. 9 is prevented but the exposure and the like is performed based on the horizontal synchronization signal as shown in FIG. 10.

Figure 16:
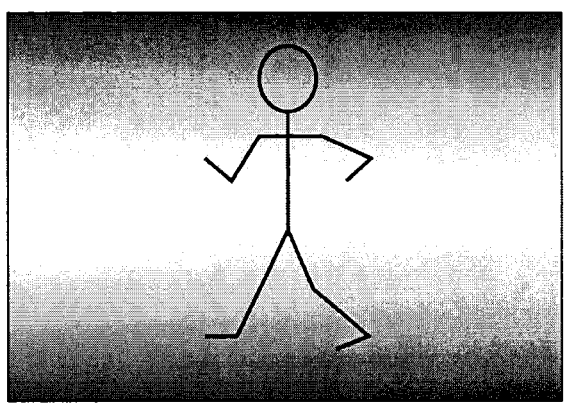
FIG. 16 is a diagram illustrating an example of an imaging image where uneven luminance has occurred in a shading form in the vertical direction.

As a result, the imaging image which is output from the image sensor 47a in FIG. 4 may be generated so that there is higher luminance in the central portion and lower luminance in other portions. In this case, in the imaging image, uneven luminance occurs in a shading form in the vertical direction as shown in FIG. 16.

Accordingly, it is desirable to suppress the uneven luminance in a shading form which occurs in the vertical direction by dispersing the horizontal synchronization periods A and the horizontal synchronization periods B in each of the vertical synchronization periods.

Second Embodiment

Configuration Example of Imaging Apparatus 91

Figure 17:
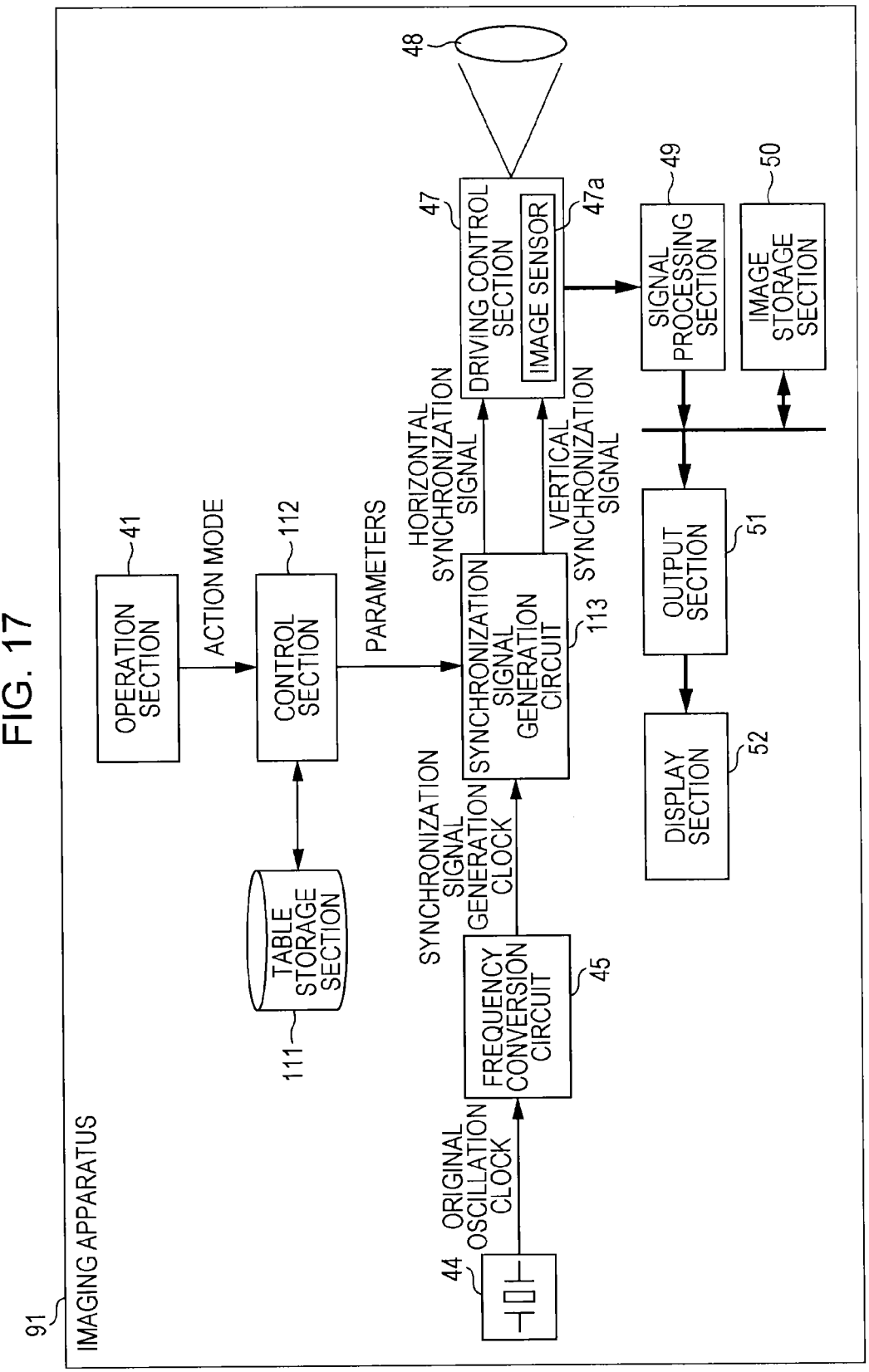
FIG. 17 is a block diagram illustrating a configuration example of an imaging apparatus in a second embodiment.

Next, FIG. 17 shows a configuration example of an imaging apparatus 91 in a second embodiment.

The imaging apparatus 91 suppresses the uneven luminance in a shading form which occurs in the vertical direction by dispersing the horizontal synchronization periods A and the horizontal synchronization periods B in each of the vertical synchronization periods.

Here, in the imaging apparatus 91 shown in FIG. 17, since the same reference numerals are given to the portions which are configured in the same manner as the case of the imaging apparatus 21 (FIG. 4) in the first embodiment, the described thereof will be appropriately omitted.

That is, the imaging apparatus 91 is configured in the same manner as the imaging apparatus 21 except for a table storage section 111, a control section 112, and a synchronization signal generation circuit 113 are respectively provided instead of the table storage section 42, the control section 43, and the synchronization signal generation circuit 46 of the imaging apparatus 21.

The table storage section 111 holds (stores) a management table in advance which manages to correspond to a parameter for activating the image sensor 47a in the action mode for each of the plurality of different action modes. Here, the management table is generated in advance as described with reference to FIG. 7 in the same manner as the case of the management table which is held in the table storage section 42 of FIG. 4.

FIG. 18 shows an example of the management table which is held in the table storage section 111. In the management table, for example, as shown in FIG. 18, the parameters are managed to correspond to a summation phase S, a comparison phase T, the decode value decA of the horizontal synchronization period A, the decode value decB of the horizontal synchronization period B, the decode value decV of the vertical synchronization period, and the like in the action mode 1 where a frame formed from 1188 horizontal lines is read out at a frame rate of 239.76 Hz.

Here, the summation phase S and the comparison phase T represent a ratio (T−S):S which is the appearance of the horizontal synchronization periods A and the horizontal synchronization period B in the vertical synchronization period.

Returning to FIG. 17, the control section 112 reads out the parameter, which corresponds to the action mode which has been selected using the selection operation by the user, from the table storage section 111 based on the operation signal from the operation section 41 and supplies the parameter to the synchronization signal generation circuit 113 in the same manner as the control section 43 of FIG. 4.

The synchronization signal generation circuit 113 generates the horizontal synchronization signal and the vertical synchronization signal according to the action mode which is selected by the user based on the parameter from the control section 112 and the synchronization signal generation clock from the frequency conversion circuit 45 and supplies the horizontal synchronization signal and the vertical synchronization signal to the driving control section 47.

Figure 19:
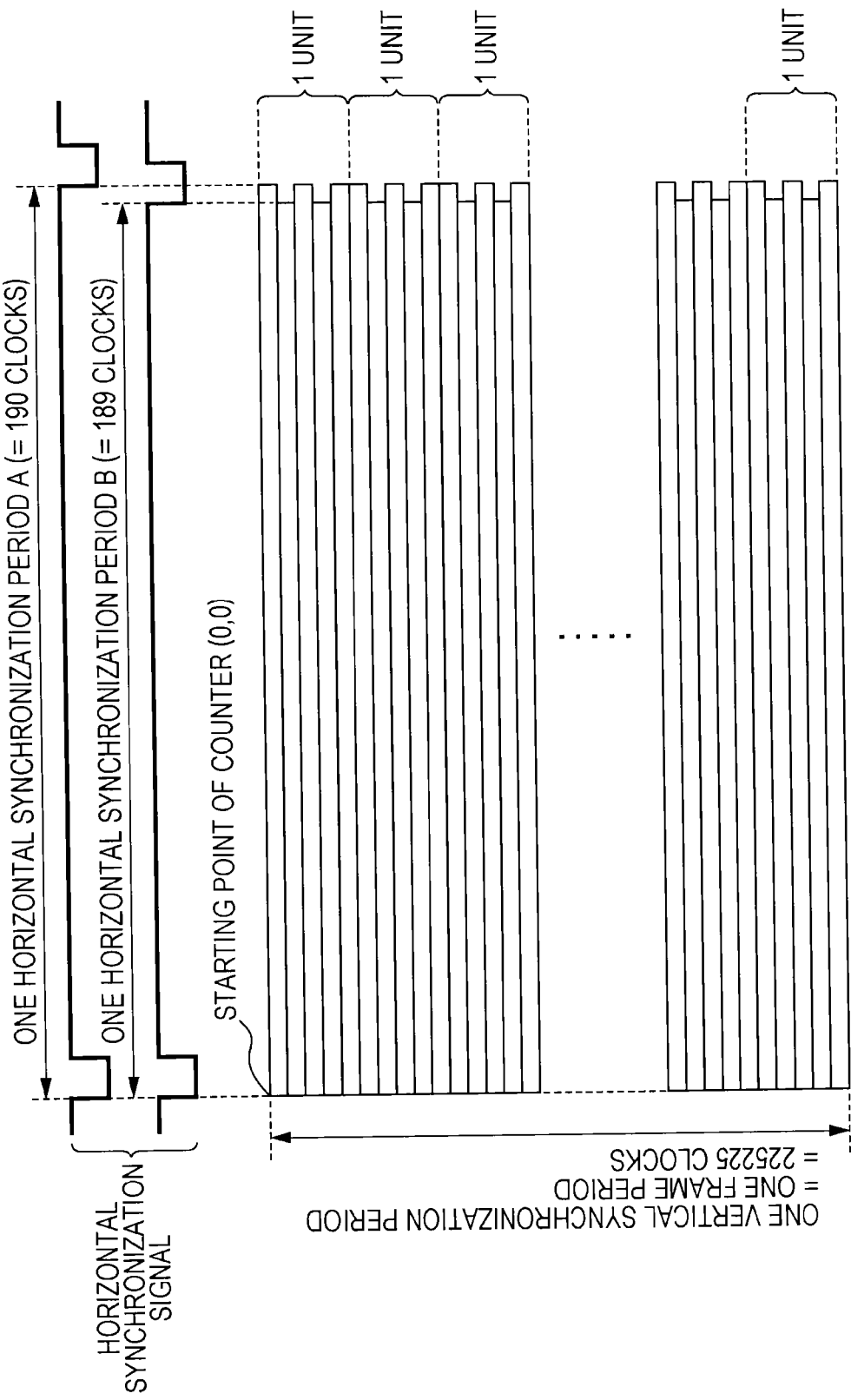
FIG. 19 is a diagram for describing an example of a concept of a process which is performed by a synchronization signal generation circuit in FIG. 17.

Next, FIG. 19 shows an example of a concept of a process which is performed by the synchronization signal generation circuit 113.

The synchronization signal generation section 113 segments one period of the vertical synchronization period into a plurality of unit periods and generates the horizontal synchronization signal which generates the horizontal synchronization periods A and the horizontal synchronization periods B in the ratio of (T−S):S for each of the unit periods.

That is, for example, the synchronization signal generation circuit 113 generates the horizontal synchronization signal which generates the horizontal synchronization periods A and the horizontal synchronization periods B in a ratio of 1:1 for each of the unit periods as shown in FIG. 19. Here, in this case, it is desirable that the horizontal synchronization periods A be not continuously generated and the horizontal synchronization periods A be dispersed in the unit periods as shown in FIG. 19. This is the same for the horizontal synchronization periods B.

Figure 20:
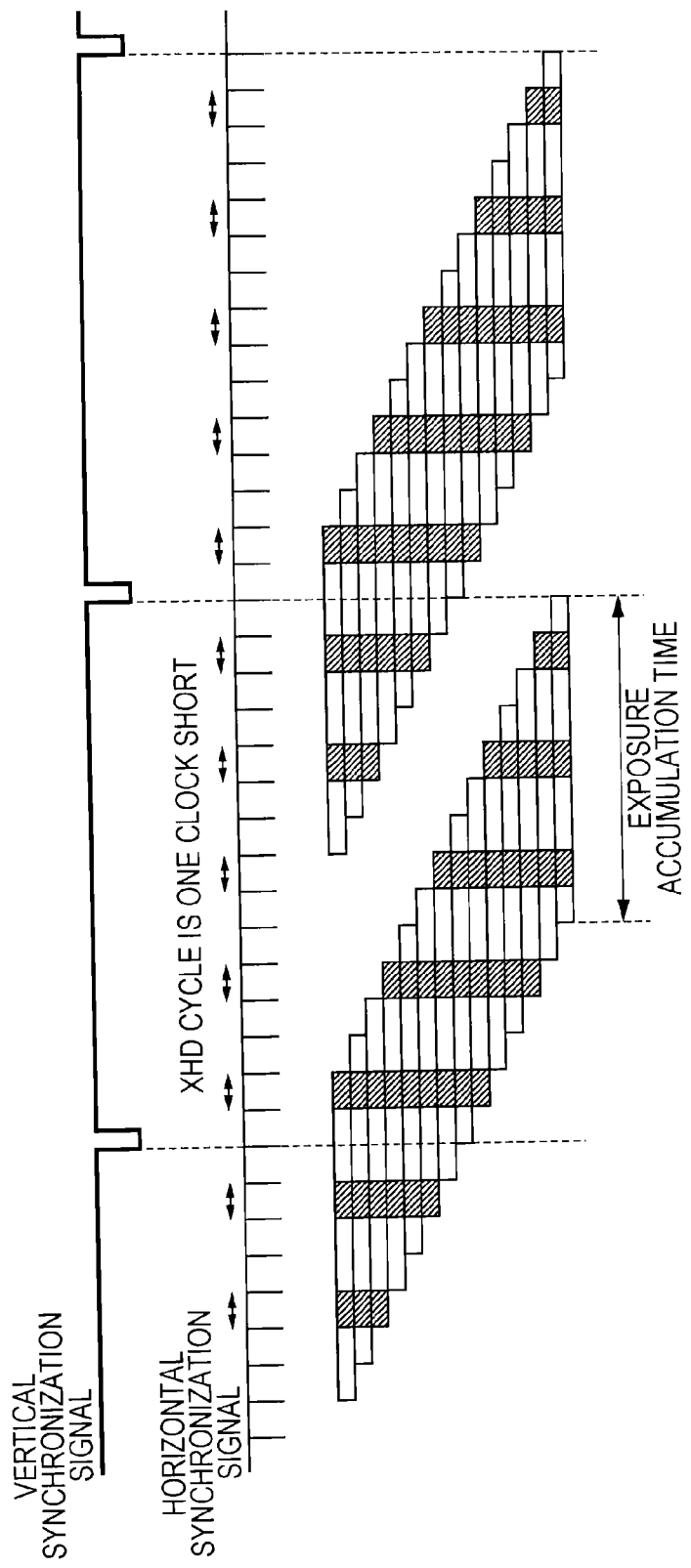
FIG. 20 is a diagram illustrating an example of a case where horizontal synchronization periods with different number of clocks are distributed and generated.

Due to this, the horizontal synchronization signal which disperses the horizontal synchronization periods A and the horizontal synchronization periods B is output from the synchronization signal generation circuit 113 to the driving control section 47 as shown in FIG. 20. Here, the horizontal synchronization signal which generates the horizontal synchronization periods A and the horizontal synchronization periods B with a ratio of 2:1 is shown in FIG. 20.

In the image sensor 47a, the exposure and the like is performed by synchronizing the horizontal synchronization signal which disperses and generates the horizontal synchronization periods A and the horizontal synchronization periods B as shown in FIG. 20.

Figure 21:
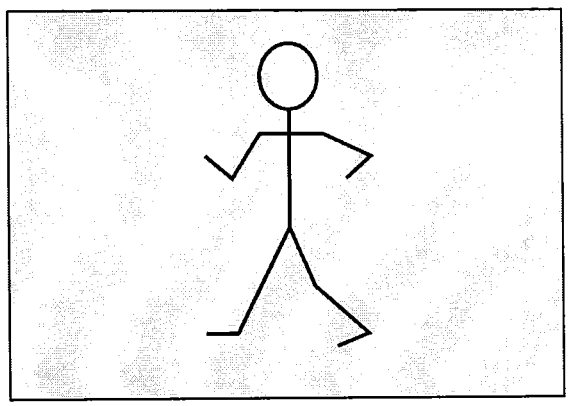
FIG. 21 is a block diagram illustrating an example of an imaging image where uneven luminance has been reduced.

As a result, in the image sensor 47a, the exposure accumulation time is (substantially) uniform for each line which configures the image sensor 47a. Accordingly, it is possible to obtain the imaging image where the uneven luminance is reduced for each horizontal line in the image sensor 47a as shown in FIG. 21.

Details of Synchronization Signal Generation Circuit 113

Figure 22:
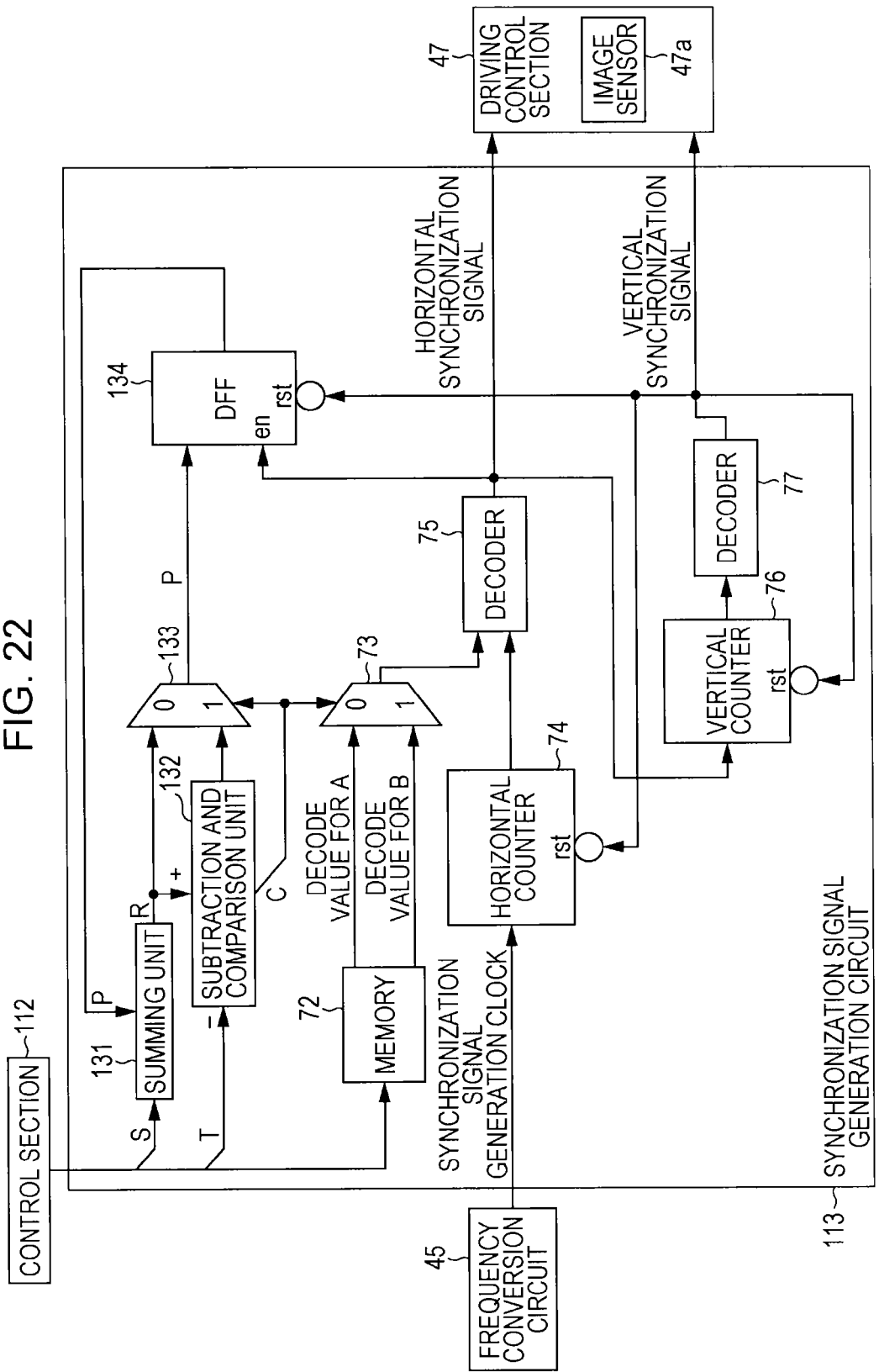
FIG. 22 is a block diagram illustrating a detailed configuration example of a synchronization signal generation circuit in FIG. 17.

FIG. 22 shows a detailed configuration example of the synchronization signal generation circuit 113.

Here, in the synchronization signal generation circuit 113, since the same reference numerals are given to the portions which are configured in the same manner as the case of the synchronization signal generation circuit 46 of FIG. 13, the described thereof will be appropriately omitted.

That is, the synchronization signal generation circuit 113 is configured in the same manner as the synchronization signal generation circuit 46 of FIG. 13 except for an addition unit 131 and a DFF (delay flip-flop) 134 being provided instead of the comparison unit 71 and the line counter 78 of the synchronization signal generation circuit 46.

The summation phase S as the parameter from the control section 112 and an accumulation phase P from the DEF 134 are supplied to the addition unit 131. The addition unit 131 adds the summation phase S from the control section 112 to the accumulation phase P from the DEF 134 and the addition result R (=P+S) is supplied to a subtraction and comparison unit 132 and a selection unit 133.

The comparison phase T is supplied to the subtraction and comparison unit 132 from the control section 112 as the parameter. The subtraction and comparison unit 132 subtracts the comparison phase T from the control section 112 from the addition result R from the addition unit 131 and the subtraction result (R−T) is supplied to the selection unit 133.

In addition, the subtraction and comparison unit 132 compares the addition result R from the addition unit 131 and the comparison phase T from the control section 112. Then, the subtraction and comparison unit 132 sets a flag C as one in a case where it is determined that the addition result R is equal to or more than the comparison phase T (R≥T) based on the comparison result and supplies the flag C to the selection unit 73 and the selection unit 133.

Furthermore, the subtraction and comparison unit 132 sets a flag C as zero in a case where it is determined that the addition result R is smaller than the comparison phase T (R<T) based on the comparison result and supplies the flag C to the selection unit 73 and the selection unit 133.

Here, the selection unit 73 reads out the decode value decA from the memory 72 in a case where the flag C (=0) is supplied from the subtraction and comparison unit 132 and the decode value decA is output to the decoder 75. In addition, the selection unit 73 reads out the decode value decB from the memory 72 in a case where the flag C (=1) is supplied from the subtraction and comparison unit 132 and the decode value decB is output to the decoder 75.

The selection unit 133 holds the addition result R from the addition unit 131 by being supplied to the DEF 134 as the new accumulation phase P in the case where the flag C (=0) is supplied from the subtraction and comparison unit 132.

In addition, the selection unit 133 holds the subtraction result (R−T) from the subtraction and comparison unit 132 by being supplied to the DEF 134 as the new accumulation phase P in the case where the flag C (=1) is supplied from the subtraction and comparison unit 132.

The DEF 134 holds the value 0 in advance as the accumulation phase P. The DEF 134 outputs the accumulation phase P which has been held each time the falling edge is generated in the horizontal synchronization signal which is supplied from the decoder 75 to the addition unit.

In addition, the DEF 134 holds (stores) the accumulation phase P from the selection unit 133 as the new accumulation phase P by overwriting.

Furthermore, the DEF 134 resets (changes) the accumulation phase P which has been held to zero each time the falling edge is generated in the horizontal synchronization signal which is supplied from the decoder 77.

Concept of Process Performed by Addition Unit 131 and DEF 134

Figure 23:
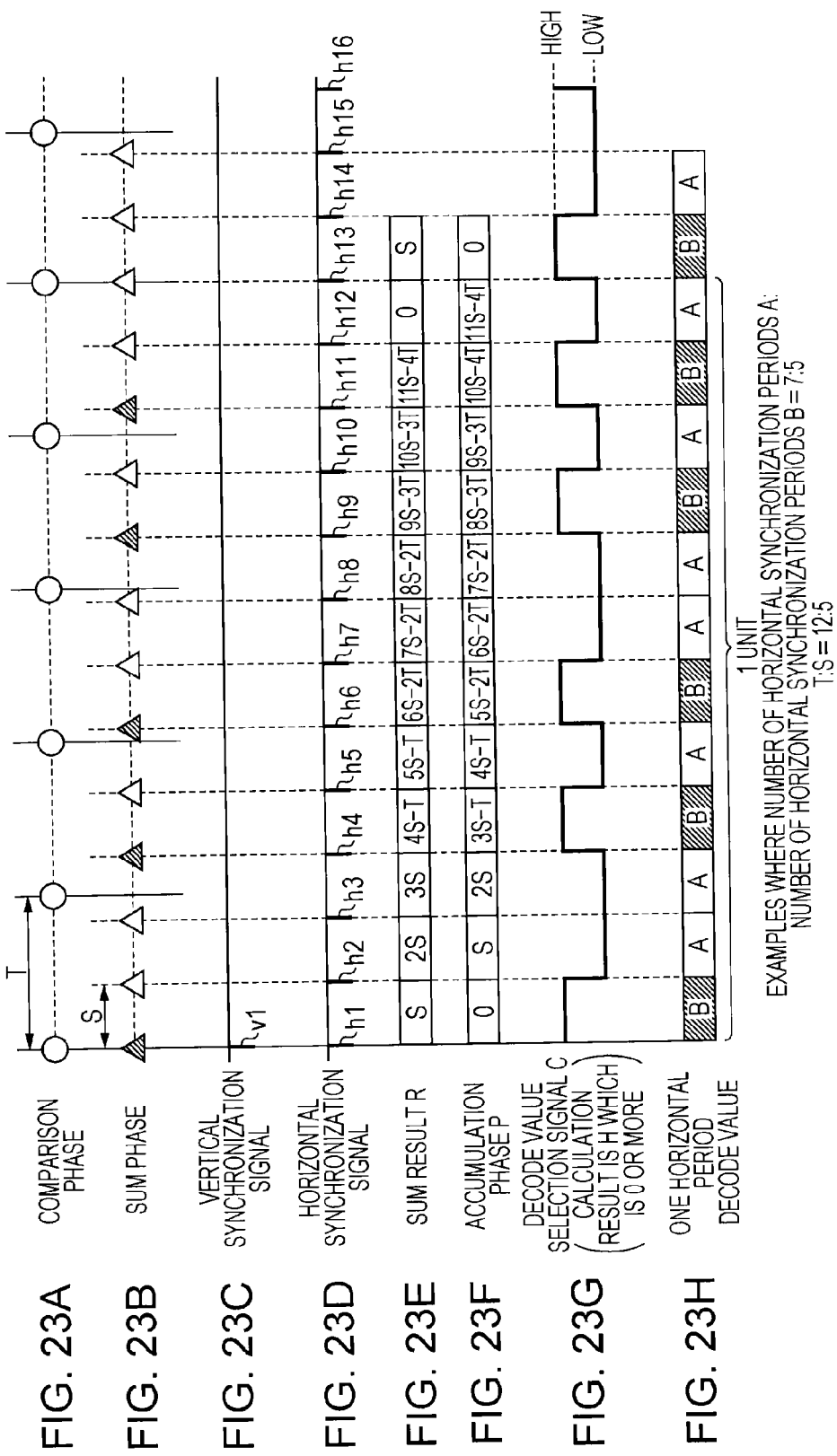
FIG. 23 is another diagram for describing an example of a concept of a process which is performed by a synchronization signal generation circuit in FIG. 17.

Next, FIG. 23 mainly shows an example of a concept of a process which is performed by the addition unit 131 and the DEF 134 of the synchronization signal generation circuit 113.

An example of the comparison phase T which is supplied to the subtraction and comparison unit 132 from the control section 112 is shown in A of FIG. 23. In addition, an example of the summation phase S which is supplied from the addition unit 131 to the control section 112 is shown in B of FIG. 23.

An example of the vertical synchronization signal which is supplied from the decoder 77 is shown in C of FIG. 23. In addition, an example of the horizontal synchronization signal which is output from the decoder 75 is shown in D of FIG. 23.

An example of the addition result R of the summation phase S and the accumulation phase P which is output from the addition unit 131 is shown in E of FIG. 23. In addition, an example of the accumulation phase P which is output from the DEF 134 is shown in F of FIG. 23.

An example of a decode selection signal as the flag C which is output from the subtraction and comparison unit 132 is shown in G of FIG. 23. In G of FIG. 23, the flag C is set as the value 1 in a case where the decode selection signal is high and the flag C is set as the value 0 in a case where the decode selection signal is low.

An example of the decode value for the horizontal synchronization period which is output from the selection unit 73 is shown in H of FIG. 23.

Here, the ratio T:S of the comparison phase T and the summation phase S is set so that, for example, T:S=12:5 as shown in the lower side of H of FIG. 23.

Accordingly, the ratio of (T−S):S of the horizontal synchronization periods A and the horizontal synchronization periods B which is generated in one period of the unit period is 7:5. In addition, the ratio is able to be represented as S=5T/12.

For example, the addition result is set as R=S (E of FIG. 23) and the accumulation phase is set as P=0 (F of FIG. 23) to correspond to a falling edge v1 (C of FIG. 23) being generated in the vertical synchronization signal and a falling edge h1 (D of FIG. 23) being generated in the horizontal synchronization signal. Then, since the addition result R is smaller than the comparison phase T, the decode value decA (G of FIG. 23) is output from the selection unit 73 with regard to the decoder 75. Due to this, the horizontal synchronization period which represents the interval from the next falling edge h2 to a falling edge h3 is set as the horizontal synchronization period A.

That is, for example, the DEF 134 resets the accumulation phase P which has been held to zero to correspond to the generation of the falling edge v1 in the vertical synchronization signal which is supplied from the decoder 77 as shown in C of FIG. 23.

Then, the DEF 134 outputs the accumulation phase P which has been reset to zero as shown in F of FIG. 23 to the addition unit 131 to correspond to the generation of the falling edge h1 in the horizontal synchronization signal which is supplied from the decoder 75 as shown in D of FIG. 23.

At this time, the addition unit 131 adds the summation phase S from the control section 112 and the accumulation phase P (=0) from the DEF 134 and outputs the addition result R (=S) shown in E of FIG. 23 to the subtraction and comparison unit 132 and the selection unit 133.

The subtraction and comparison unit 132 compares the addition result R (=S=5T/12) from the addition unit 131 and the comparison phase T from the control section 112. In the case here, since R<T, the subtraction and comparison unit 132 outputs the flag C (=0) which corresponds to a decode value selection signal Low to the selection unit 73 and the selection unit 133.

The selection unit 73 outputs the decode value decA according to the flag C (=0) from the subtraction and comparison unit 132 as shown in H of FIG. 23 to the decoder 75 as a value which represents the number of clocks of the horizontal synchronization period from the falling edge h2 which follows the falling edge h1 to the falling edge h3 in the horizontal synchronization signal.

The selection unit 133 holds the addition result R (=S) from the addition unit 131 as the new accumulation phase P according to the flag C (=0) from the subtraction and comparison unit 132 by supplying the addition result R to the DEF 134.

Next, the addition result R is set so that R=2S (E of FIG. 23) and the accumulation phase P is set so that P=S (F of FIG. 23) to correspond to the generation of the falling edge h2 (D of FIG. 23) by the horizontal synchronization signal. Then, since the addition result R is smaller than the comparison phase T, the decode value decA (G of FIG. 23) is output from the selection unit 73 with regard to the decoder 75. Due to this, the horizontal synchronization period which represents the interval from the next falling edge h3 to a falling edge h4 is set as the horizontal synchronization period A.

That is, for example, the DEF 134 outputs the accumulation phase P which is set to the value S to the addition unit 131 as shown in F of FIG. 23 to correspond to the generation of the falling edge h2 in the horizontal synchronization signal which is supplied from the decoder 75 as shown in D of FIG. 23.

At this time, the addition unit 131 adds the summation phase S from the control section 112 and the accumulation phase P (=S) from the DEF 134 and outputs the addition result R (=2S) shown in E of FIG. 23 to the subtraction and comparison unit 132 and the selection unit 133.

The subtraction and comparison unit 132 compares the addition result R (=2S=10T/12) from the addition unit 131 and the comparison phase T from the control section 112. In the case here, since R<T, the subtraction and comparison unit 132 outputs the flag C (=0) which corresponds to the decode value selection signal Low to the selection unit 73 and the selection unit 133.

The selection unit 73 outputs the decode value decA according to the flag C (=0) from the subtraction and comparison unit 132 as shown in H of FIG. 23 to the decoder 75 as a value which represents the number of clocks of the horizontal synchronization period from the falling edge h3 which follows the falling edge h2 to the falling edge h4 in the horizontal synchronization signal.

The selection unit 133 holds the addition result R (=2S) from the addition unit 131 as the new accumulation phase P according to the flag C (=0) from the subtraction and comparison unit 132 by supplying the addition result R to the DEF 134.

Here, the addition result R is set so that R=3S (E of FIG. 23) and the accumulation phase P is set so that P=2S (F of FIG. 23) to correspond to the generation of the falling edge h3 (D of FIG. 23) by the horizontal synchronization signal. Then, since the addition result R is equal to or more than the comparison phase T, the decode value decB (G of FIG. 23) is output from the selection unit 73 with regard to the decoder 75. Due to this, the horizontal synchronization period which represents the interval from the next falling edge h4 to a falling edge h5 is set as the horizontal synchronization period B. Beyond this, the process is performed in the same manner in the cases where the falling edges h4, h5, . . . are generated in the horizontal synchronization signal.

Description of Action of Imaging Apparatus 91

Next, details of the imaging process which is performed by the imaging apparatus 91 will be described with reference to the flowchart of FIG. 24.

Figure 24:
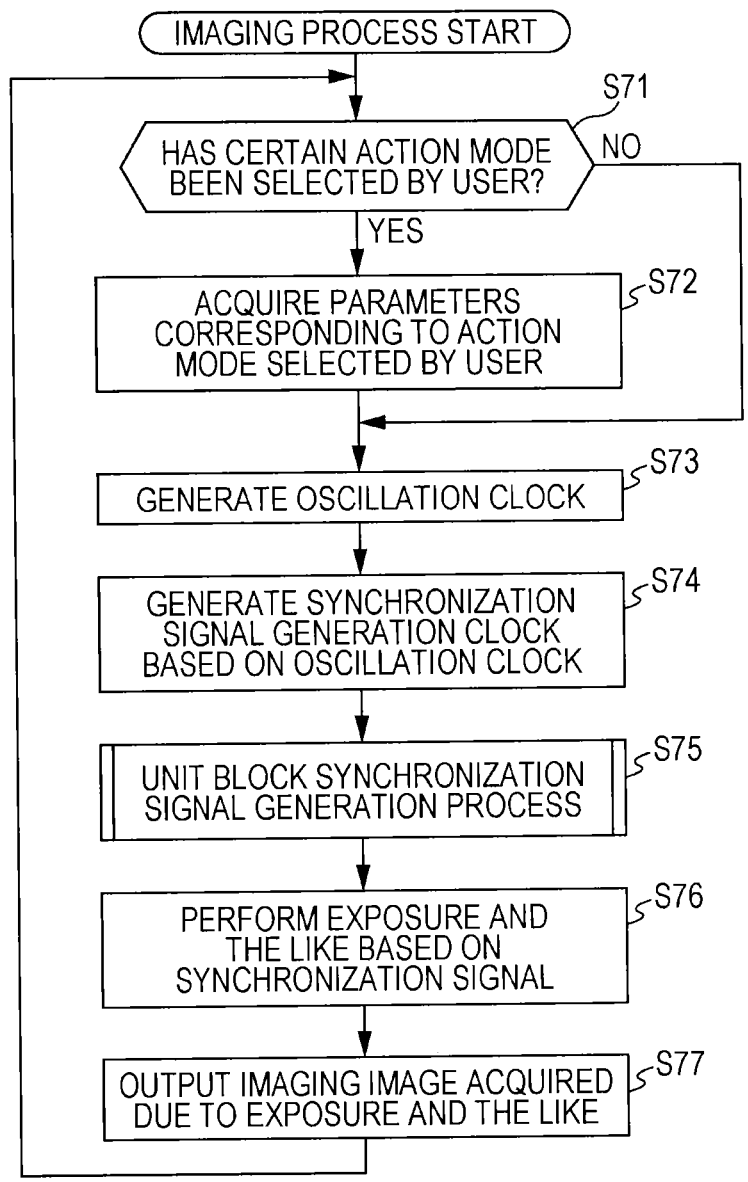
FIG. 24 is a flowchart for describing an imaging process which is performed by the imaging apparatus in FIG. 17.

The imaging process of FIG. 24 is started when, for example, an operation where the power of the imaging apparatus 91 is turned on or the like is performed by the user operating the operation section 41.

In step S71, in the same manner as the control section 43 of FIG. 4, the control section 112 determines whether or not a selection operation where a certain action mode is selected by the user operating the operation section 41 has been performed according to the operation signal from the operation section 41. Then, in a case where the control section 112 determines that the selection operation has been performed by the user according to the operation signal from the operation section 41, the process progresses to step S72.

In step S72, in the same manner as the control section 43 of FIG. 4, the control section 112 reads out the parameter, which corresponds to the action mode which has been selected using the selection operation by the user, from the management table which is held in the table storage section 111 and supplies the parameter to the synchronization signal generation circuit 113.

Here, in step S71, in a case where the control section 112 determines that the selection operation has not been performed by the user according to the operation signal from the operation section 41, step S72 is skipped and the process progresses to step S73.

At this time, from when the imaging process of FIG. 24 is started, in a case where the selection operation by the user has not yet been performed, the control section 112 reads out the parameter, which corresponds to the action mode which has been determined in advance, from the management table which is held in the table storage section 111 and supplies the parameter to the synchronization signal generation circuit 113.

In step S73 and step S74, processes are performed respectively in the same manner as step S23 and step S24 of FIG. 14. Due to this, the original oscillation clock is supplied to the frequency conversion circuit 45 from the clock generation unit 44 and the synchronization signal generation clock which is acquired by converting the original oscillation clock in the frequency conversion circuit 45 is supplied to the synchronization signal generation circuit 113.

In step S75, the synchronization signal generation circuit 113 performs a unit block synchronization signal generation process where the horizontal synchronization signal and the vertical synchronization signal are generated according to the action mode which is selected by the user based on the parameter from the control section 112 and the synchronization signal generation clock from the frequency conversion circuit 45. Here, the details of the unit block synchronization signal generation process will be described later with reference to the flowchart of FIG. 25.

The synchronization signal generation circuit 113 supplies the horizontal synchronization signal and the vertical synchronization signal which are acquired due to the unit block synchronization signal generation process to the driving control section 47.

Here, after the process has progressed from step S75 to step S76, the synchronization signal generation circuit 113 continues to execute the unit block synchronization signal generation process based on the parameter which has been supplied from the control section 112. Accordingly, the horizontal synchronization signal and the vertical synchronization signal are constantly supplied from the synchronization signal generation circuit 113 to the driving control section 47.

In step S76 and step S77, processes are performed respectively in the same manner as step S26 and step S27 of FIG. 14. Then, after the completion of the process of step S77, the process returns to step S71, and beyond this, the process is performed in the same manner.

Here, for example, the imaging process of FIG. 24 is completed when an operation which cancels the imaging of the subject by the imaging sensor 47a is performed by the user operating the operation section 41 or the like.

Details of Unit Block Synchronization Signal Generation Process

Figure 25:
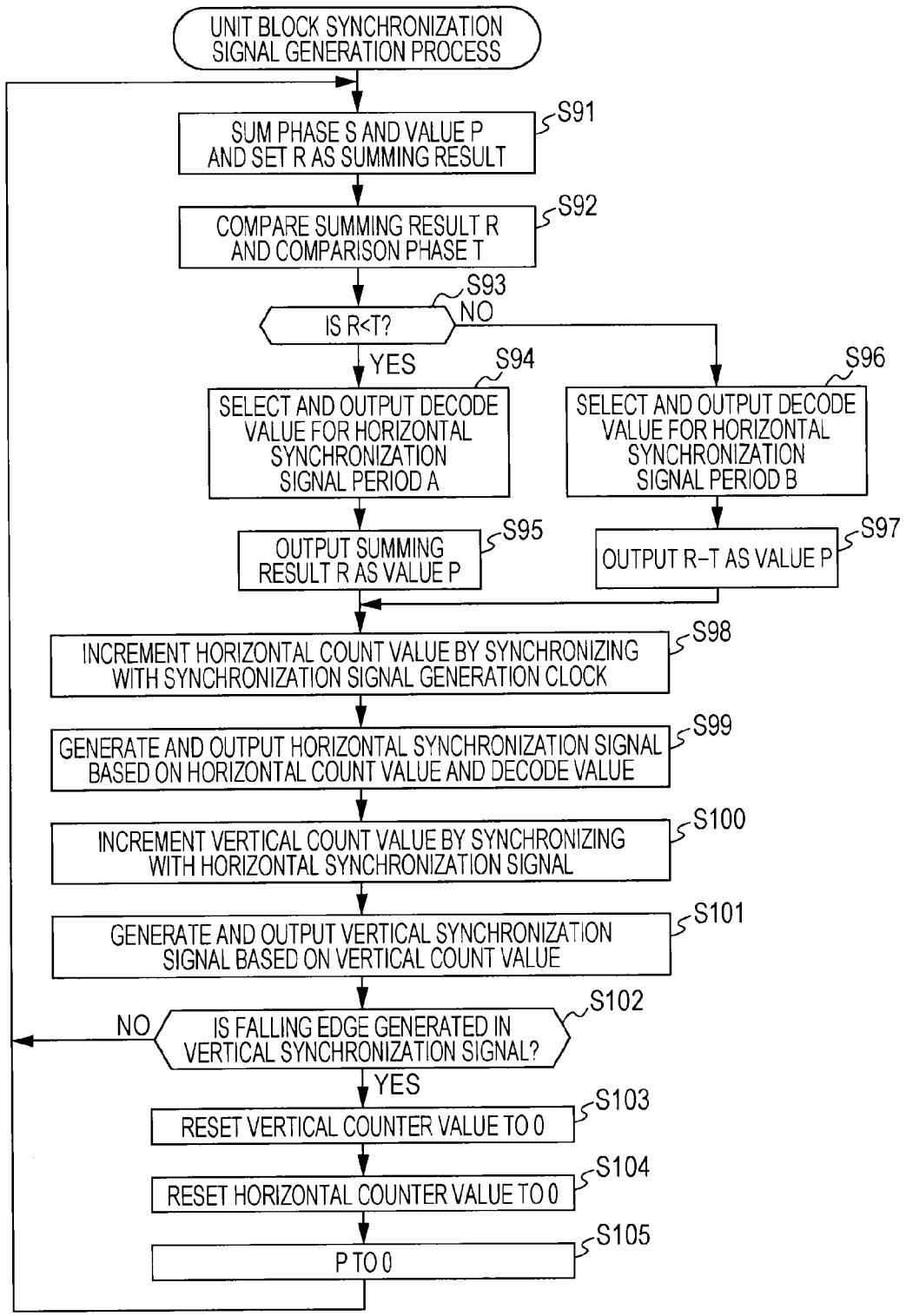
FIG. 25 is a flowchart for describing in detail a unit block synchronization signal generation process in step S75 of FIG. 24.

The details of the unit block synchronization signal generation process in step S75 of FIG. 24 will be described with reference to the flowchart of FIG. 25.

In step S91, the addition unit 131 adds the accumulation phase P from the DEF 134 and the summation phase S as the parameter from the control section 112 to correspond to the supplying of the accumulation phase P from the DEF 134 and supplies the addition result R (=P+S) to the subtraction and comparison unit 132 and the selection unit 133.

Here, the DEF 134 supplies the accumulation phase P which has been held to the addition unit 132 to correspond to the generating of the falling edge in the horizontal synchronization signal from the decoder 75.

In step S92, the subtraction and comparison unit 132 compares the addition result R from the addition unit 131 and the comparison phase T as the parameter from the control section 112. In addition, the subtraction and comparison unit 132 subtracts the comparison phase T from the control section 112 from the addition result R from the addition unit 131 and supplies the subtraction result (R−T) to the selection unit 133.

In step S93, the subtraction and comparison unit 132 sets the flag C to zero and supplies the flag C to the selection unit 73 and the selection unit 133 in a case where it is determined that the addition result R is less than the comparison phase T (when R<T) based on the comparison result in step S92 and the process progresses to step S94.

In step S94, the selection unit 73 reads out the decode value decA from the memory 72 and supplies the decode value decA to the decoder 75 to correspond to the supplying of the flag C (=0) from the subtraction and comparison unit 132.

In step S95, the selection unit 133 outputs the addition result R from the addition unit 131 to the DEF 134 as the new accumulation phase P to correspond to the supplying of the flag C (=0) from the subtraction and comparison unit 132.

In addition, in step S93, the subtraction and comparison unit 132 sets the flag C to one and supplies the flag C to the selection unit 73 and the selection unit 133 in a case where it is determined that the addition result R is equal to or more than the comparison phase T (when R≥T) based on the comparison result in step S92 and the process progresses to step S96.

In step S96, the selection unit 73 reads out the decode value decB from the memory 72 and outputs the decode value decB to the decoder 75 to correspond to the supplying of the flag C (=1) from the subtraction and comparison unit 132.

In step S97, the selection unit 133 outputs the subtraction result (R−T) from the subtraction and comparison unit 132 to the DEF 134 as the new accumulation phase P to correspond to the supplying of the flag C (=1) from the subtraction and comparison unit 132.

Figure 15:
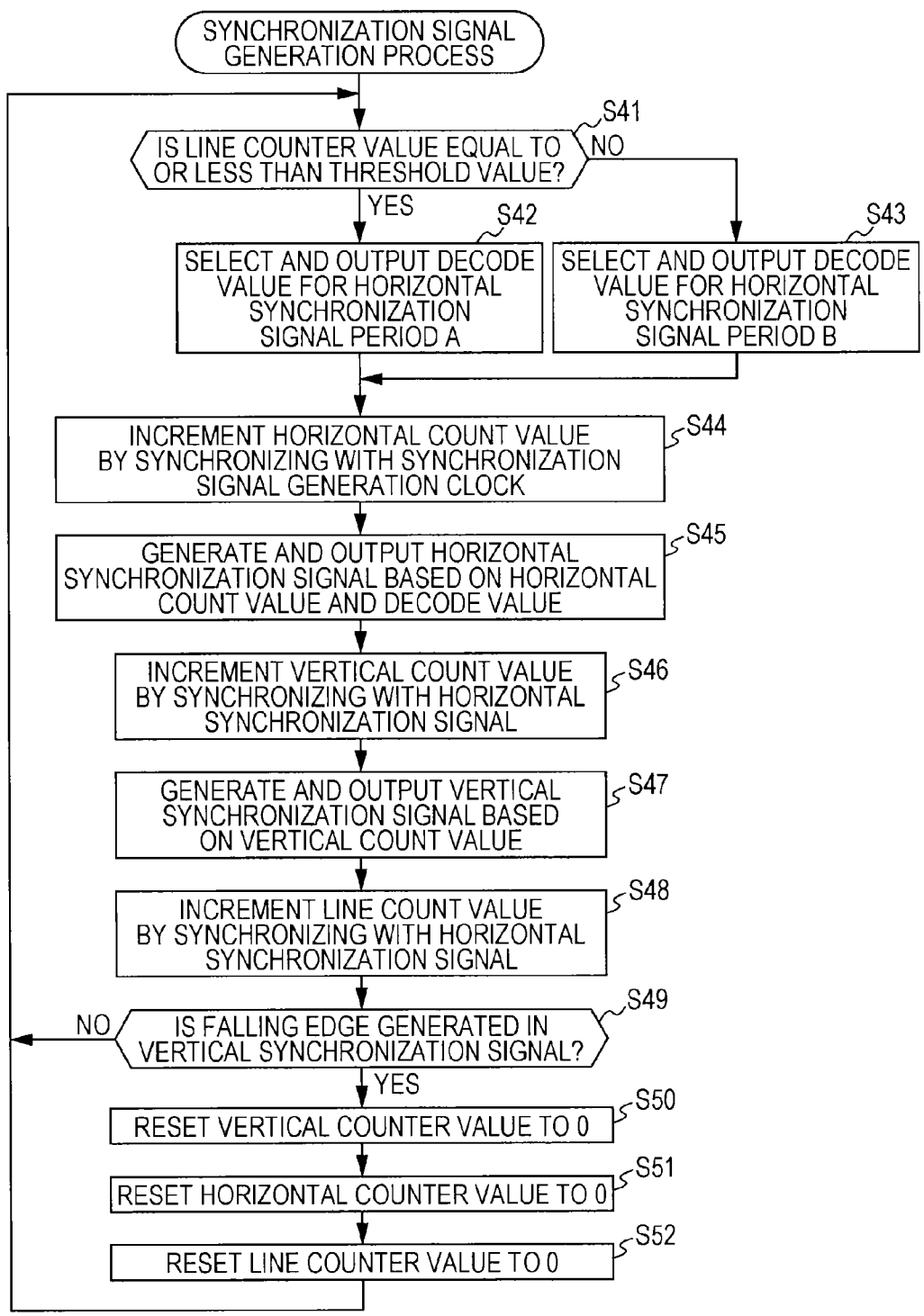
FIG. 15 is a flowchart for describing in detail a synchronization signal generation process in step S25 of FIG. 14.

In step S98 to step S101, processes are performed respectively in the same manner as step S44 to step S47 of FIG. 15.

In step S102, in a case where the decoder 77 outputs the vertical synchronization signal without generating the falling edge, the process returns to step S91, and beyond this, the process is performed in the same manner, in the same manner as the case of step S49 in FIG. 15.

In addition, in step S102, the process progresses to step S103 to correspond to the decoder 77 outputting the vertical synchronization signal where the falling edge is generated.

In step S103 and step S104, processes are performed respectively in the same manner as step S50 and step S51 of FIG. 15.

In step S105, the DEF 134 resets (changes) the accumulation phase P which has been held to the value 0 to correspond to the generation of the falling edge in the vertical synchronization signal which is supplied from the decoder 77, the process returns to step S91, and beyond this, the process is performed in the same manner.

As described above, according to the imaging process of FIG. 24, since the first to fourth conditions which are necessary for the actions of the image sensor 47a are satisfied and the horizontal synchronization signal is generated for driving in the action mode which is desired by the user, it is possible to drive the image sensor 47a in the action mode which is desired by the user.

In addition, according to the imaging process of FIG. 24, as shown in FIG. 19, the vertical synchronization period is segmented into each unit period and the horizontal synchronization signal, which generates the horizontal synchronization periods A and the horizontal synchronization periods B in the certain ratio of (T−S):S for each of the unit periods, is generated.

As a result, as shown in FIG. 20, since the horizontal synchronization periods A and the horizontal synchronization periods B which are different by only one clock are arranged to be dispersed in the vertical synchronization period, it is possible for an imaging image where the uneven luminance has been removed (smoothened) to be obtained as shown in FIG. 21.

3. Modified Example

In the first and second embodiments, the number of horizontal synchronization periods in one period of the vertical synchronization period is the number of horizontal lines which configures the imaging image. However, other than this, for example, it is possible for the number of the horizontal periods to be more than the number of horizontal lines which configure the imaging image as shown in FIG. 26.

Figure 26:
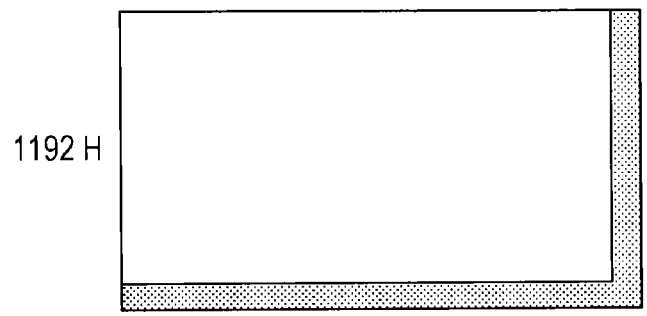
FIG. 26 is a diagram illustrating an example of a case of generating a horizontal synchronization signal which generates horizontal synchronization periods which are more than the number of lines which configure an imaging image.

That is, for example, as shown in FIG. 26, it is possible for the horizontal synchronization periods in one period of the vertical synchronization period to be 1192 periods in a case where the vertical synchronization signal and the horizontal synchronization signal are generated using the synchronization signal generation clock where the clock frequency is 54 MHz and the imaging image which is configured using 1080 horizontal lines is read out at a frame rate of 239.76 Hz (=240 fps) from the image sensor 47a.

In this case, if the summation phase S is set so that S=1 and the comparison phase T is set so that T=4, the 1092 periods of the horizontal synchronization periods are in a mixed state where 206 clocks of the horizontal synchronization periods B and 207 clocks of the horizontal synchronization periods A are in a ratio of 3:1. Here, in FIG. 26, the number of clocks of the horizontal synchronization periods and the number of horizontal synchronization periods are adjusted using the providing of blanking periods.

In addition, as shown in FIG. 26, it is possible for the number of clocks in the horizontal synchronization period to be more than n clocks which is the minimum necessary for A/D conversion and the output of the signal value.

In the first and second embodiments, there is description where the frequency of the synchronization signal generation clock is a fixed frequency (for example, 54 MHz).

However, for example, the frequency conversion circuit 45 may generates and output the synchronization signal generation clock with a higher frequency according to a difference in the different exposure accumulation times (the exposure accumulation times where the configuration ratios of the horizontal synchronization periods A and the horizontal synchronization periods B which configure the exposure accumulation time are different) out of the exposure accumulation times of each of the lines which configure the image sensor 47a.

In this case, since it is possible to further shorten the period of one clock which is the difference in the horizontal synchronization period A and the horizontal synchronization period B by increasing the frequency of the synchronization signal generation clock, it is possible to further shorten the difference in the period of the horizontal synchronization period A and the horizontal synchronization period B.

As a result, even if the difference in the different exposure accumulation times (difference in luminance) out of the exposure accumulation times of each of the lines which configure the image sensor 47a stands out considerably, it is possible to reduce the difference in the different exposure accumulation times to the extent that it is not conspicuous.

In the first and second embodiment described above, the horizontal synchronization period A and the horizontal synchronization period B which are different by only one clock are adopted as the horizontal synchronization periods, but the horizontal synchronization periods are not limited thereto.

That is, for example, any horizontal synchronization period is sufficient as long as it is the horizontal synchronization period which matches the falling edge of the horizontal synchronization signal which is generated at the timing of the completion of the last horizontal synchronization period in the vertical synchronization period and the falling edge of the vertical synchronization signal which is generated at the timing of the completion of the vertical synchronization period and the first to fourth conditions are satisfied.

Specifically, for example, the horizontal synchronization period A and the horizontal synchronization period B may be set as period which are different by only m (>1) clocks.

In addition, for example, it is possible to configure one period of the vertical synchronization period using a plurality of horizontal synchronization periods where horizontal synchronization periods A, B, and C which each have a different number of clocks are in a mixed state.

That is, other than the two periods of the horizontal synchronization periods which are different (for example, the horizontal synchronization periods A and the horizontal synchronization periods B), one period of the vertical synchronization period may be configured from a plurality of horizontal synchronization periods where each horizontal synchronization period of three or more periods which are different are in a mixed state.

In addition, as the imaging apparatus, it is possible to apply the present disclosure in either a case where there is an image sensor which generates and outputs an imaging image as the frame image or a case where there is an image sensor which generates and outputs an imaging image as the field image.

In the first embodiment, the image sensor 47a is driven in an action mode which is selected by the user due to the selection of the action mode of the image sensor 47a.

However, other than this, for example, it is possible for the user to input the number of lines, the number of pixels, the frame rate, the read out speed, and the like of the imaging image using the operation section 41 to represent the action mode which is desired by the user.

In this case, the control section 43 may calculate the parameter such as the decode value decA, the decode value decB, the decode value decV, the threshold, and the like based on the number of lines, the number of pixels, the frame rate, the read out speed, and the like which is input by the user and outputs the parameter to the synchronization signal generation circuit 46. In addition, the control section 43 may calculate the parameter based on the selected action mode also in a case where the action mode is selected by the user out of a plurality of action modes which are determined in advance. This is the same as the second embodiment.

Here, it is possible for the present disclosure to be configured in the following manner.

(1) A driving apparatus which includes an acquisition section which acquires a parameter for driving an imaging element, which receives an optical image from a subject and outputs an imaging image as an electric signal, in an action mode which is desired by a user, a timing generation section which generates respective timings of the starting of each of a plurality of horizontal synchronization periods, where horizontal synchronization periods which are only different in terms of the number of clocks determined in advance are acquired in a mixed state, based on the parameter, and a driving control section which receives the optical image from the subject for each line which configures the imaging element by synchronizing the respective timings which are generated using the timing generation section.

(2) The driving apparatus described in (1) where the plurality of horizontal synchronization periods are horizontal synchronization periods which are acquired in a mixed state to be only different in terms of the number of clocks determined in advance in a ratio so as to match a timing of completion of a vertical synchronization period which represents an interval where the imaging image is output from the imaging element and a timing of completion of the final horizontal synchronization period in the vertical synchronization period.

(3) The driving apparatus described in (2) where the plurality of horizontal synchronization periods are horizontal synchronization periods which are acquired in a mixed state to be only different in terms of the number of clocks determined in advance for a plurality of unit periods which configure the vertical synchronization period.

(4) The driving apparatus described in (2) or (3) where the number of horizontal synchronization periods in the vertical synchronization period is the number of the respective lines, which configure the imaging image, or more.

(5) The driving apparatus described in (2) to (4) where the horizontal synchronization period is a number of clocks which is a number of clocks, which is determined in advance based on the imaging element, or more.

(6) The driving apparatus described in (2) to (5) where the timing generation section generates the respective timings of the starting of each of n horizontal synchronization periods which have the same length in a case where the vertical synchronization period matches the n (n is a positive integer) periods of the horizontal synchronization periods which have the same length, and generates the respective timings of the starting of each of the plurality of horizontal synchronization periods, which are acquired in a mixed state to be only different in terms of the number of clocks determined in advance in a case where the vertical synchronization period does not match the n periods of the horizontal synchronization periods which have the same length.

(7) The driving apparatus described in (2) to (6) where the driving control section receives the optical image from the subject for each line which configures the imaging element in a light receiving accumulation time from the timing to the completion of the predetermined plurality of horizontal synchronization periods, and the number of clocks represents the number of clocks which are generated with a frequency based on a difference in different light receiving accumulation time out of the light receiving accumulation time for each line which configures the imaging element.

(8) The driving apparatus described in (2) to (7) where the acquisition section acquires the parameter by calculation based on the action mode which is desired by the user.

(9) The driving apparatus described in (2) to (7) where the acquisition section acquires the parameter which corresponds to the action mode which is desired by the user out of a plurality of parameters which are held in a holding section which holds parameters in advance for each of a plurality of action modes.

(10) The driving apparatus described in (2) to (7) where the timing generation section also generates a timing of starting of the vertical synchronization period based on the parameter, and the driving control section further outputs the imaging image to the imaging element by synchronizing the timing of the starting of the vertical synchronization period.

(11) A driving method of a driving apparatus which drives an imaging element including acquiring a parameter for driving an imaging element, which receives an optical image from a subject and outputs an imaging image as an electric signal, in an action mode which is desired by a user, generating respective timings of the starting of each of a plurality of horizontal synchronization periods where horizontal synchronization periods, which are only different in terms of the number of clocks determined in advance, are acquired in a mixed state based on the parameter, and receiving the optical image from the subject for each line which configures the imaging element by synchronizing the respective timings which are generated in the generating of the respective timings, using the driving apparatus.

(12) A program for making a computer function as an acquisition section which acquires a parameter for driving an imaging element, which receives an optical image from a subject and outputs an imaging image as an electric signal, in an action mode which is desired by a user, a timing generation section which generates respective timings of the starting of each of a plurality of horizontal synchronization periods, where horizontal synchronization periods which are only different in terms of the number of clocks determined in advance are acquired in a mixed state, based on the parameter, and a driving control section which receives the optical image from the subject for each line which configures the imaging element by synchronizing the respective timings which are generated using the timing generation section.

Here, it is possible for the series of processes described above to be executed using hardware or to be executed using software. In a case where the series of processes is executed using software, a program which configures the software is installed in computer with built-in specialized hardware or is installed in a general computer or the like which is able to execute various processes by installing various types of programs from a program recording medium.

Configuration Example of Computer

Figure 27:
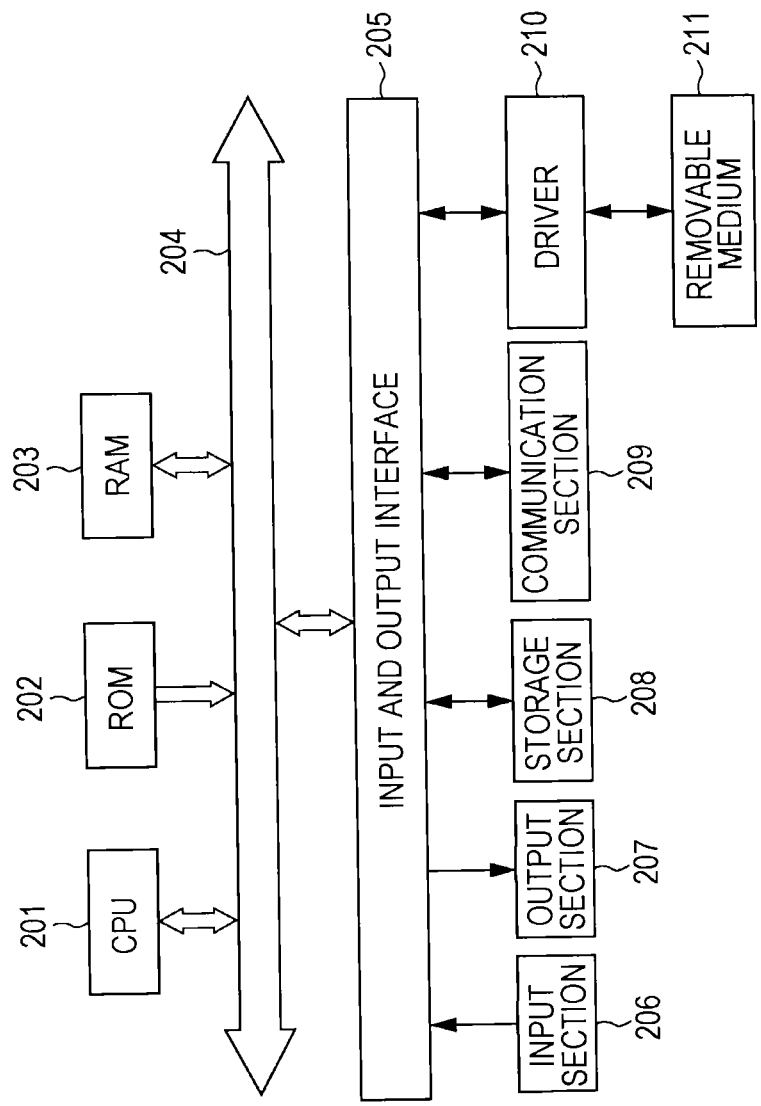
FIG. 27 is a block diagram illustrating a configuration example of a computer.

FIG. 27 shows a configuration example of hardware of a computer which executes the series of processes described above using a program.

A CPU (Central Processing Unit) 201 executes various types of processes in accordance with a program stored in a ROM (Read Only Memory) 202 or a storage section 208. A program executed by the CPU 201, data, and the like are appropriately stored in a RAM (Random Access Memory) 203. The CPU 201, the ROM 202, and the RAM 203 are connected to each other via a bus 204.

The CPU 201 is connected to an input and output interface 205 via the bus 204, and an input section 206 formed from a keyboard, a mouse, a microphone, or the like, and an output device 207 formed from a display, a speaker, or the like is connected in the input and output interface 205. The CPU 201 executes various processes in correspondence with commands input from the input section 206 and outputs the results of the processing to the output section 707.

The storage section 208 which is connected to the input/output interface 205 is formed from, for example, a hard disk, and stores the program executed by the CPU 201 and various types of data. A communication section 209 communicates with an external apparatus via a network such as the internet, a local area network, or the like.

In addition, a program may be acquired via the communication section 209 and stored in the storage section 208.

A drive 210 which is connected to the input/output interface 205 drives a removable medium 211 such as a magnetic disc, an optical disc, a magneto optical disc, a semiconductor memory, or the like when loaded and acquires a program, data, or the like which is stored thereon. The program and data which is acquired is transferred to the storage section 208 if necessary and stored.

As shown in FIG. 27, the recording medium which records (stores) the program which is installed onto a computer and is in a state to be executed by the computer is configured by the removable medium 211 which is a package medium such as a magnetic disc (including a floppy disc), an optical disc (including a CD-ROM (Compact Disc-Read Only Memory) or a DVD (Digital Versatile Disc)), a magneto optical disc (including a MD (Mini-Disc), or a semiconductor memory, a hard disk which is configured by the ROM 202 or the storage section 208 which temporarily or permanently stores the program, or the like. The recording of the program to the recordable medium is able to be performed using a wired or wireless communication medium such as a local area network, the Internet, or digital satellite broadcasting via the communication section 209 which is an interface such as a router or a modem if necessary.

Here, the steps which described the series of processes described above in the specifications are able to be executed not only in a time series in accordance with the described order but may be executed in parallel or independently without being processed in a time series.

In addition, the present disclosure is not limited to the embodiments described above and various modifications are possible within the scope that does not depart from the gist of the disclosure.

The present disclosure contains subject matter related to that disclosed in Japanese Priority Patent Application JP 2011-225478 filed in the Japan Patent Office on Oct. 13, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A driving apparatus comprising:
    circuitry configured to
        acquire a parameter for driving an imaging element, which receives an optical image from a subject and outputs an image as an electric signal in an action mode which is desired by a user;
        generate respective timings of the starting of each of a plurality of horizontal synchronization periods, where horizontal synchronization periods which are only different in terms of the number of clocks determined in advance are acquired in a mixed state based on the parameter; and
        receive the optical image from the subject for each line which configures the imaging element by synchronizing the respective timings, wherein
    the plurality of horizontal synchronization periods are horizontal synchronization periods which are acquired in a mixed state to be only different in terms of the number of clocks determined in advance in a ratio so as to match a timing of completion of a vertical synchronization period which represents an interval where the image is output from the imaging element and a timing of completion of the final horizontal synchronization period in the vertical synchronization period, and
    the plurality of horizontal synchronization periods are horizontal synchronization periods which are acquired in a mixed state in the ratio to be only different in terms of the number of clocks determined in advance for a plurality of unit periods which configure the vertical synchronization period.

2. The driving apparatus according to claim 1, wherein
    the number of horizontal synchronization periods in the vertical synchronization period is the number of the respective lines, which configure the image, or more.

3. The driving apparatus according to claim 2, wherein
    the horizontal synchronization period is a number of clocks, which is determined in advance based on the imaging element, or more.

4. The driving apparatus according to claim 3, wherein the circuitry is configured to
    generate the respective timings of the starting of each of n horizontal synchronization periods which have the same length in a case where the vertical synchronization period matches the n (n is a positive integer) periods of the horizontal synchronization periods which have the same length; and
    generate the respective timings of the starting of each of the plurality of horizontal synchronization periods, which are acquired in a mixed state to be only different in terms of the number of clocks determined in advance in a case where the vertical synchronization period does not match the n periods of the horizontal synchronization periods which have the same length.

5. The driving apparatus according to claim 4, wherein
    the circuitry is configured to receive the optical image from the subject for each line which configures the imaging element in a light receiving accumulation time from the timing to the completion of the predetermined plurality of horizontal synchronization periods, and
    the number of clocks represents the number of clocks which are generated with a frequency based on a difference in different light receiving accumulation time out of the light receiving accumulation time for each line which configures the imaging element.

6. The driving apparatus according to claim 5, wherein
the circuitry is configured to acquire the parameter by calculation based on the action mode which is desired by the user.

7. The driving apparatus according to claim 5, wherein
the circuitry is configured to acquire the parameter which corresponds to the action mode which is desired by the user out of a plurality of parameters which are held in a memory configured to store parameters in advance for each of a plurality of action modes.

8. The driving apparatus according to claim 5, wherein the circuitry is configured to
generate a timing of starting of the vertical synchronization period based on the parameter, and
output the image to the imaging element by synchronizing the timing of the starting of the vertical synchronization period.

9. A driving method of a driving apparatus which drives an imaging element comprising:
acquiring a parameter for driving an imaging element, which receives an optical image from a subject and outputs an image as an electric signal, in an action mode which is desired by a user;
generating respective timings of the starting of each of a plurality of horizontal synchronization periods where horizontal synchronization periods, which are only different in terms of the number of clocks determined in advance, are acquired in a mixed state based on the parameter; and
receiving the optical image from the subject for each line which configures the imaging element by synchronizing the respective timings which are generated in the generating of the respective timings, using the driving apparatus, wherein
the plurality of horizontal synchronization periods are horizontal synchronization periods which are acquired in a mixed state to be only different in terms of the number of clocks determined in advance in a ratio so as to match a timing of completion of a vertical synchronization period which represents an interval where the image is output from the imaging element and a timing of completion of the final horizontal synchronization period in the vertical synchronization period, and
the plurality of horizontal synchronization periods are horizontal synchronization periods which are acquired in a mixed state in the ratio to be only different in terms of the number of clocks determined in advance for a plurality of unit periods which configure the vertical synchronization period.

10. A non-transitory computer-readable medium including a program, which when executed by an information processing device, causes the information processing device to:
acquire a parameter for driving an imaging element, which receives an optical image from a subject and outputs an image as an electric signal, in an action mode which is desired by a user;
generate respective timings of the starting of each of a plurality of horizontal synchronization periods, where horizontal synchronization periods which are only different in terms of the number of clocks determined in advance are acquired in a mixed state, based on the parameter; and
receive the optical image from the subject for each line which configures the imaging element by synchronizing the respective timings which are generated using the timing generation section, wherein
the plurality of horizontal synchronization periods are horizontal synchronization periods which are acquired in a mixed state to be only different in terms of the number of clocks determined in advance in a ratio so as to match a timing of completion of a vertical synchronization period which represents an interval where the image is output from the imaging element and a timing of completion of the final horizontal synchronization period in the vertical synchronization period, and
the plurality of horizontal synchronization periods are horizontal synchronization periods which are acquired in a mixed state in the ratio to be only different in terms of the number of clocks determined in advance for a plurality of unit periods which configure the vertical synchronization period.

* * * * *